(12) United States Patent
Kerner et al.

(10) Patent No.: US 10,940,725 B2
(45) Date of Patent: *Mar. 9, 2021

(54) DEVICE AND METHOD FOR INFLATING AND REPAIRING TIRES AND OTHER INFLATABLES

(71) Applicant: UNITED STATES THERMOELECTRIC CONSORTIUM, Chico, CA (US)

(72) Inventors: James M Kerner, Chico, CA (US); Ryan B. Kerner, Chico, CA (US); James R Shary, Chico, CA (US)

(73) Assignee: UNITED STATES THERMOELECTRIC CONSORTIUM, Chico, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/602,196

(22) Filed: Aug. 28, 2019

(65) Prior Publication Data

US 2020/0062054 A1 Feb. 27, 2020
US 2020/0223267 A9 Jul. 16, 2020

Related U.S. Application Data

(63) Continuation of application No. 15/732,489, filed on Nov. 20, 2017, now Pat. No. 10,399,397.

(Continued)

(51) Int. Cl.
*B60C 25/00* (2006.01)
*B29C 73/08* (2006.01)

(52) U.S. Cl.
CPC .............. *B60C 25/16* (2013.01); *B29C 73/08* (2013.01)

(58) Field of Classification Search
CPC ....... B29C 73/02; B29C 73/025; B29C 73/04; B29C 73/166; B29C 73/08; B60S 5/04; B60S 5/043; B60C 25/16
See application file for complete search history.

(56) References Cited

U.S. PATENT DOCUMENTS 2,812,783 A ‡ 11/1957 Bufogle ................ B29C 73/166
141/292
2,925,103 A ‡ 2/1960 Kerr ........................ B60S 5/043
141/349

(Continued)

*Primary Examiner* — Timothy P. Kelly
(74) *Attorney, Agent, or Firm* — Jonathan E. Grant; Grant Patent Services

(57) ABSTRACT

Devices are taught for filling a tire with air, gas or a liquid and repairing the tire. In one embodiment, the tire repair tool discloses an transmittal control section, with the transmittal control section comprising a proximal end, the proximal end having an opening a distal end, with the distal end having a centralized opening to align with a punctureable seal at a proximal end of a gas cartridge; a passageway positioned between the proximal end of the gas cartridge and the distal end; and a puncture tool which can puncture the punctureable seal of the gas cartridge. The puncture tool is positioned at the distal end of the transmittal control section along the air passage way. An insertion tube comprises an air inlet at a distal end of the insertion tube which is connected to the opening of the proximal end of the transmittal control section. A gas outlet passes air from a gas cartridge through the air passage way through the transmittal control section into the air inlet of the insertion tube and through the gas outlet.

45 Claims, 41 Drawing Sheets

Related U.S. Application Data

(60) Provisional application No. 62/602,611, filed on May 1, 2017, provisional application No. 62/602,260, filed on Apr. 19, 2017, provisional application No. 62/424,966, filed on Nov. 21, 2016.

(56) References Cited

U.S. PATENT DOCUMENTS

| | | | | |
|---|---|---|---|---|
| 3,834,433 | A | ‡ | 9/1974 | Thompson ............... B01J 7/00 141/19 |
| 5,012,954 | A | ‡ | 5/1991 | Will ...................... B60C 23/10 141/330 |
| 8,707,829 | B2 | ‡ | 4/2014 | Kerner ................... B29C 73/08 81/15 |
| 9,067,368 | B2 | ‡ | 6/2015 | Kerner ................... B29C 73/08 |
| 2011/0284124 | A1 | ‡ | 11/2011 | Huang ..................... B60S 5/04 141/38 |
| 2015/0258970 | A1 | ‡ | 9/2015 | Chen ..................... F04B 33/005 141/351 |
| 2019/0077099 | A1 | * | 3/2019 | Park ...................... B29C 73/06 |

\* cited by examiner
‡ imported from a related application

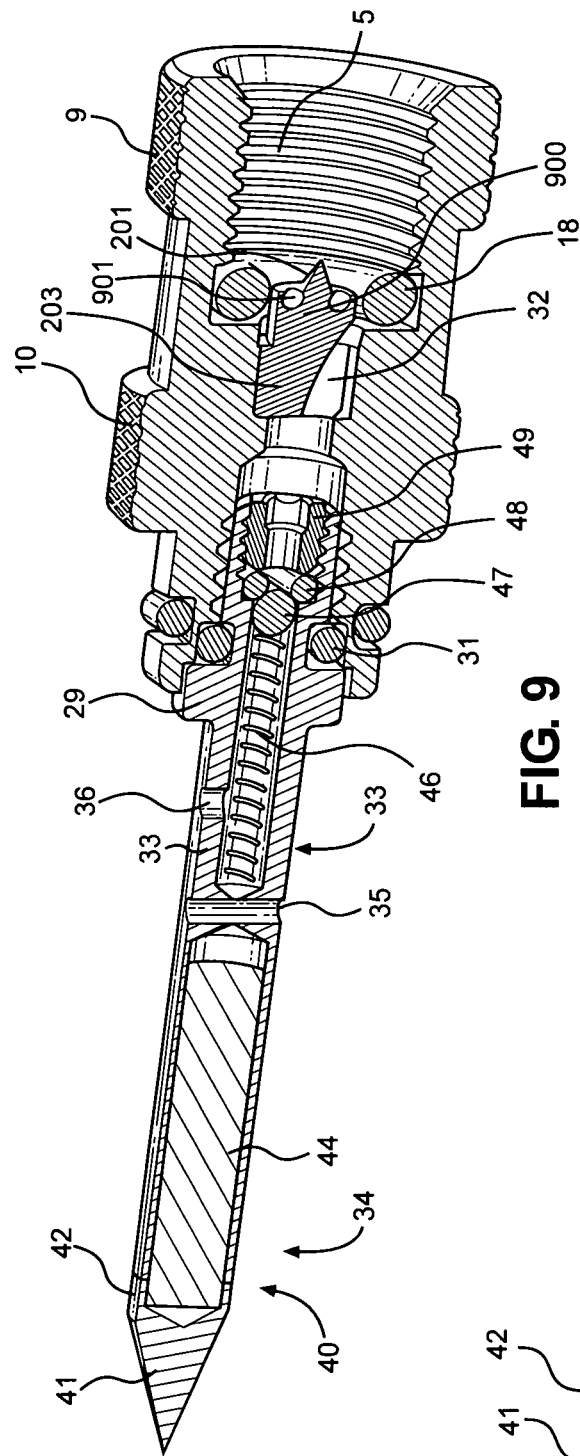
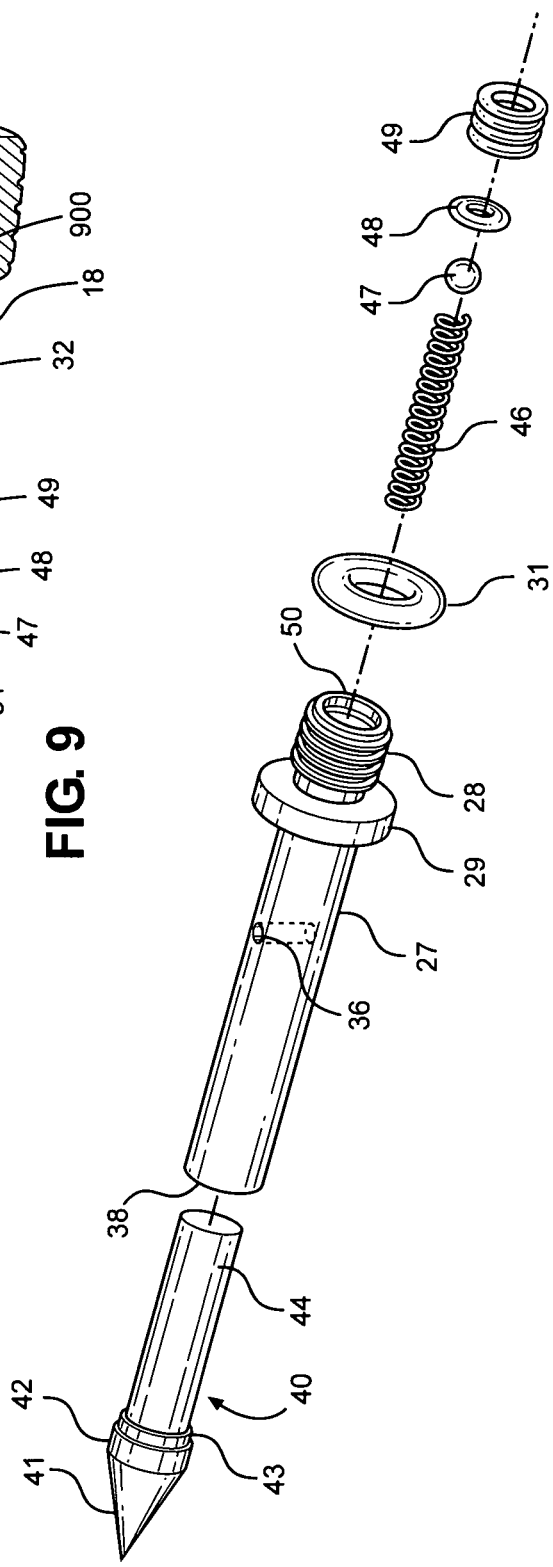
FIG. 9
FIG. 10

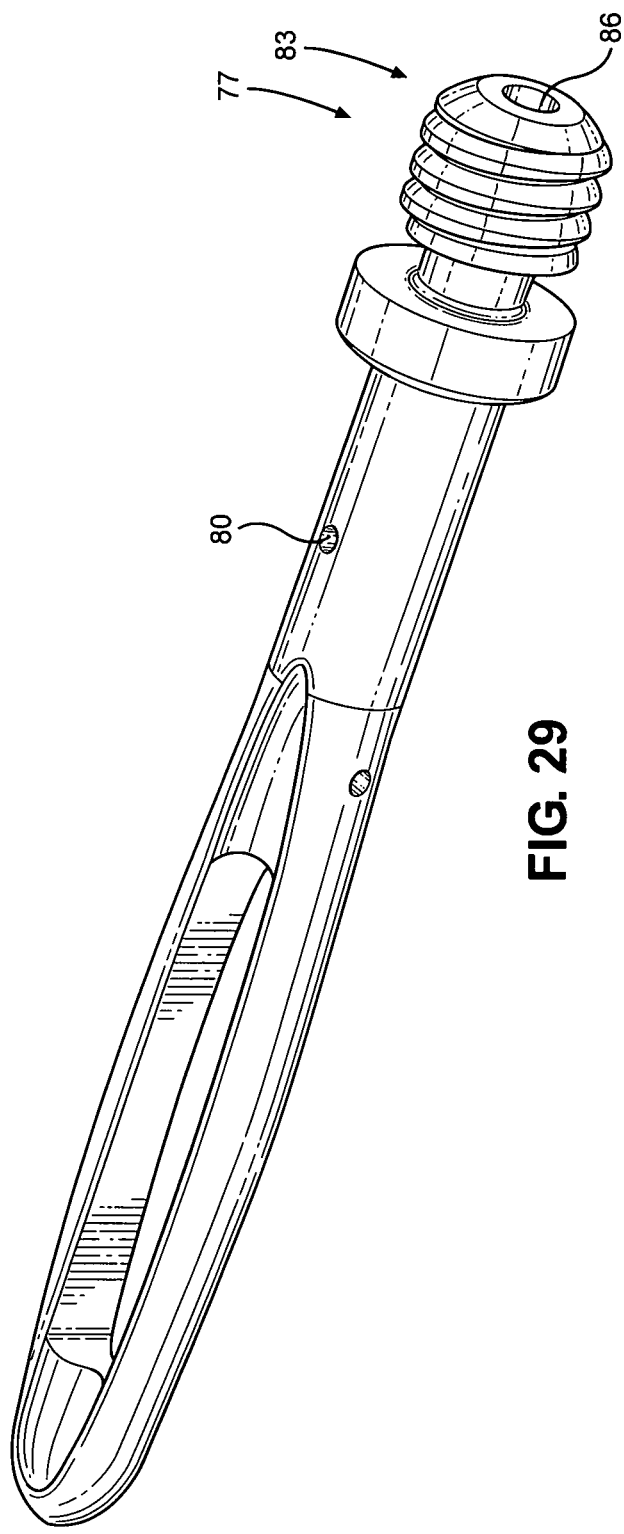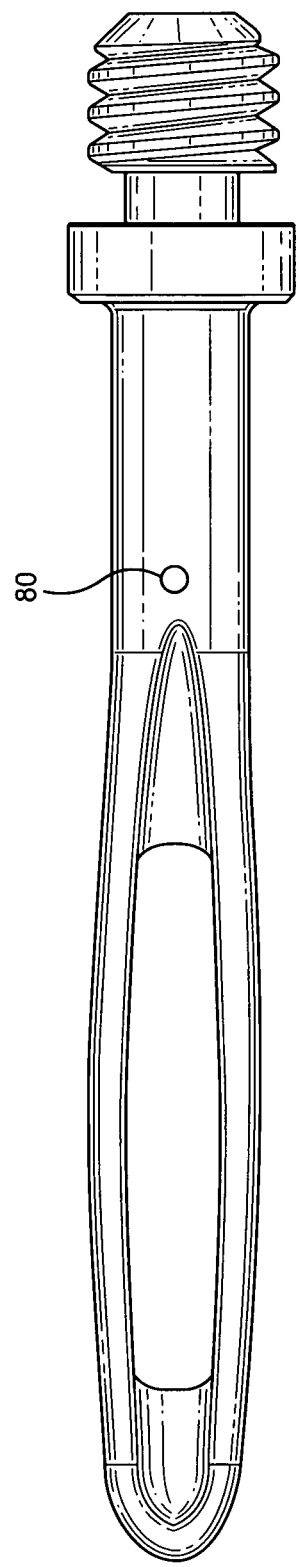
FIG. 29
FIG. 30

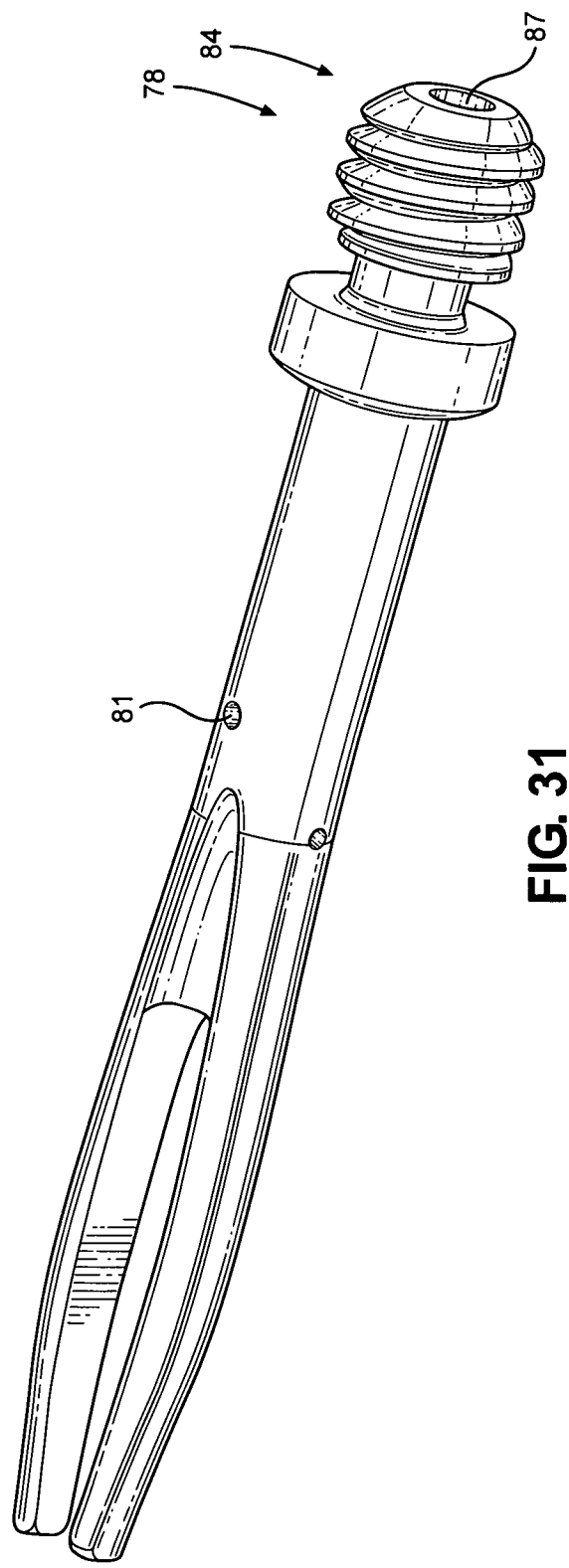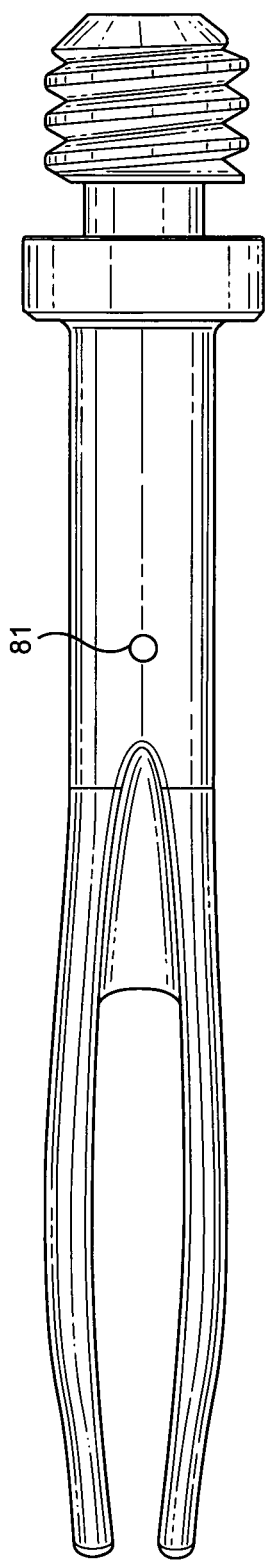
FIG. 31
FIG. 32

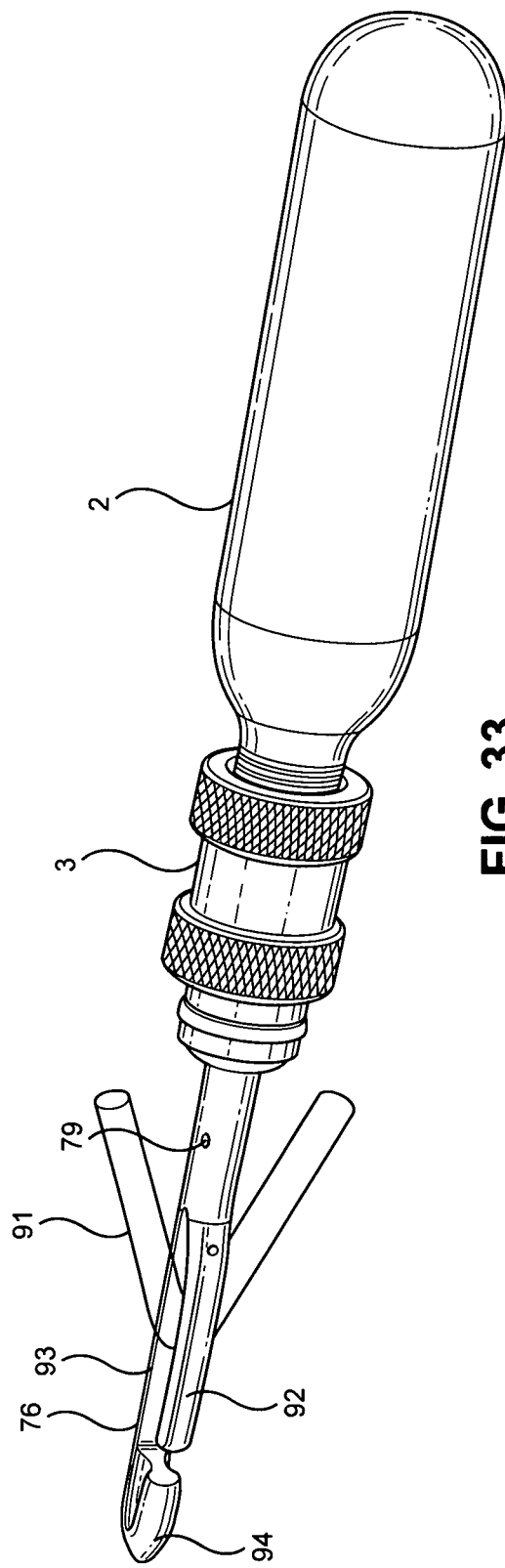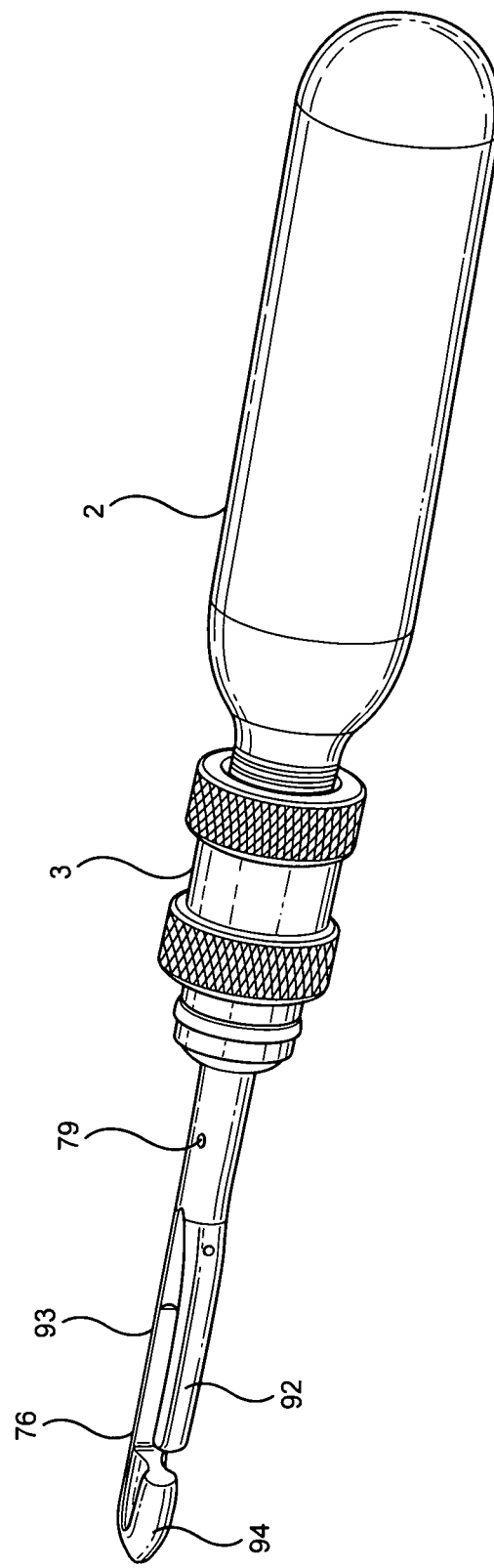

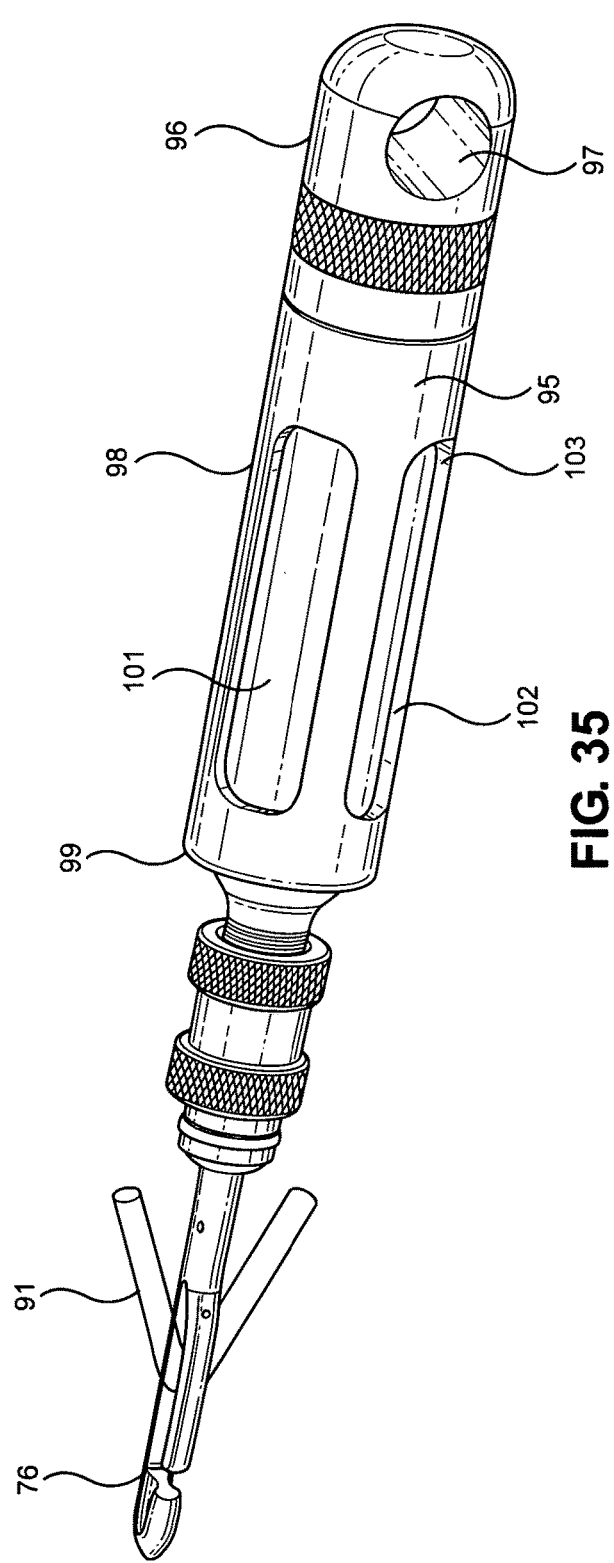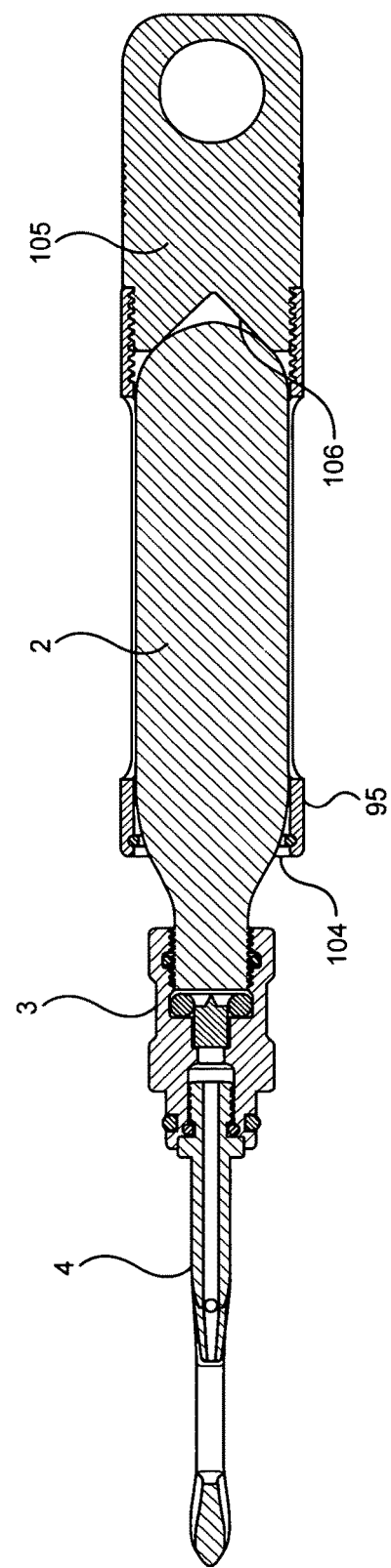
FIG. 35
FIG. 36

DEVICE AND METHOD FOR INFLATING AND REPAIRING TIRES AND OTHER INFLATABLES

This application is a continuation of U.S. patent application Ser. No. 15/732,489, filed Nov. 20, 2017, issued Sep. 3, 2019 as U.S. Pat. No. 10,399,397 which claims priority to provisional application 62/424,966, filed Nov. 21, 2016, as well as to U.S. provisional application filed 62/602,260, filed Apr. 19, 2017, and U.S. provisional application 62/602,611, filed May 1, 2017 incorporated herein in its entirety.

A tire repair tool is disclosed which can repair and inflate tires through the puncture or cut in the tire. The tire is repaired by the use and insertion of a special plug or cord material. The tool can also be used to repair and/or inflate other elastomeric items.

BRIEF DESCRIPTION OF THE FIGURES

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

FIG. 9 is a cross sectional view of the tire repair tool with the double knurled tool body;

FIG. 10 is an exploded view of one embodiment of the insertion tube;

FIG. 29 is a perspective view of another embodiment of a plugger;

FIG. 30 is a side view of the plugger embodiment of FIG. 29;

FIG. 31 is a perspective view of another embodiment of the plugger;

FIG. 32 is a side view of the plugger embodiment of FIG. 31;

FIG. 33 is a perspective view of the plugger attached to the tire repair tool with a repair cord positioned within the tongs;

FIG. 34 is a perspective view of the plugger attached to the tire repair tool without the repair cord;

FIG. 35 is a perspective view of the repair tool with a cartridge sleeve;

FIG. 36 is a cross-sectional view of the repair tool with the cartridge sleeve;

DETAILED DESCRIPTION OF THE DISCLOSURE

Figure 1:
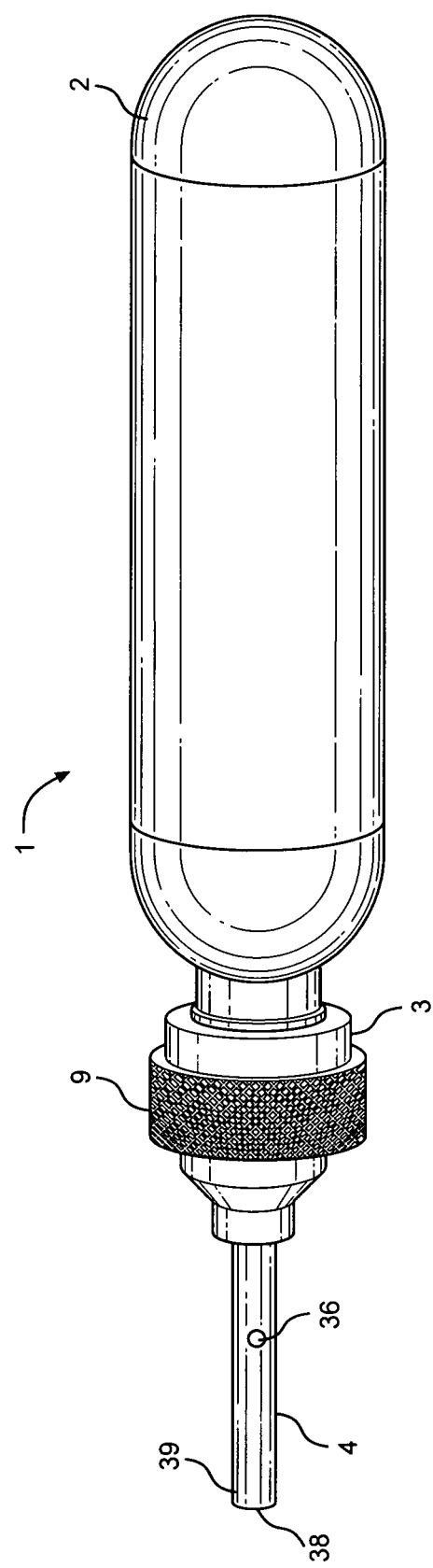
FIG. 1 is an overhead view of the tire repair tool.
Figure 2:
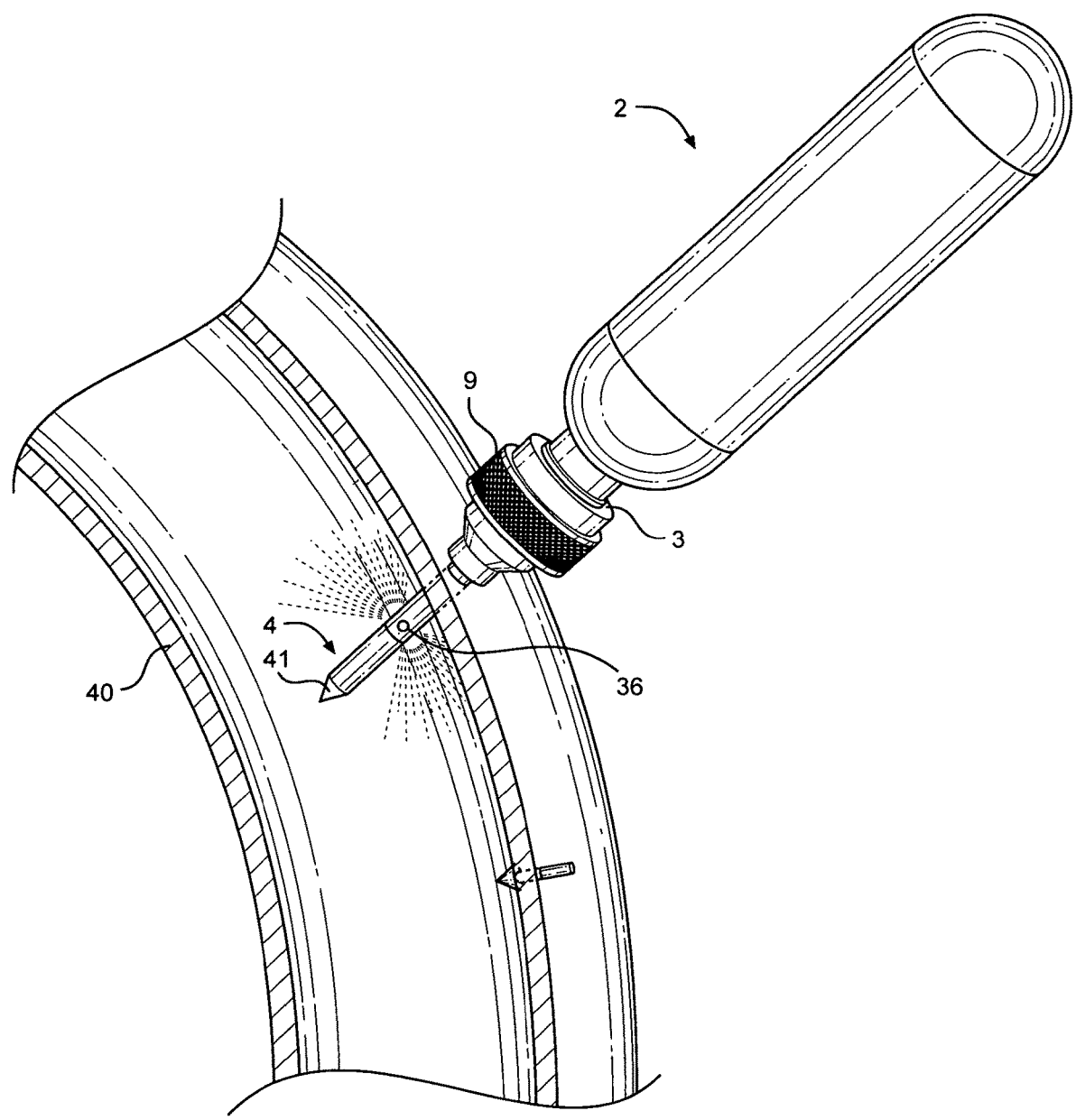
FIG. 2 is a partial cross sectional view of a repair tool with a tire repair plug and insertion tube inserted into the tire.
Figure 71:
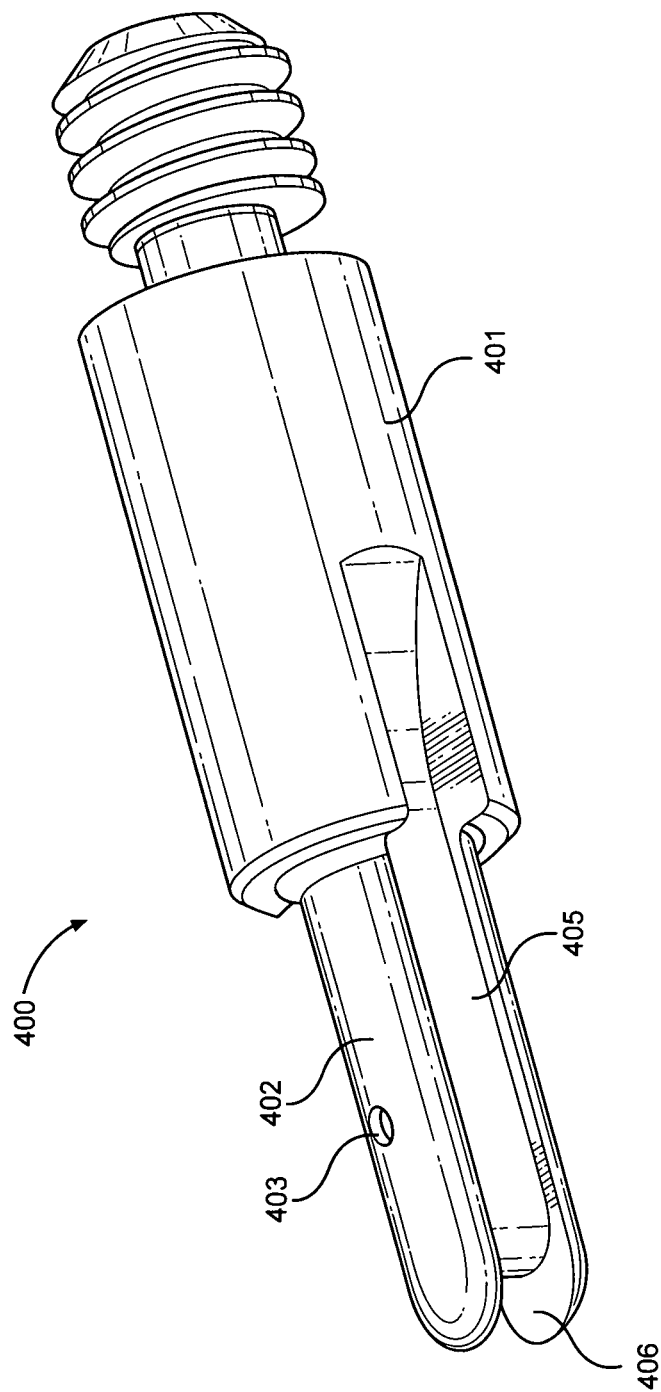
FIG. 71 is a perspective view of the embodiment of FIG. 68, without the inclusion of the filler cord.

Referring to FIGS. 1-71, the tire repair tool 1 comprises a $CO_2$ cartridge (or canister) 2, a knurled body 3, and an insertion tube 4. The gas cartridge 2 is attached to the knurled body 3, and the insertion tube 4 is attached to the knurled body. The knurled body 2 is the intermediate structure that controls the flow of gas from the gas cartridge and into the insertion tube. The insertion tube is the device by which a tire or other inflatable item receives air. In some embodiments, the insertion tube 4 is also used to repair tires or other inflatable items.

Figure 8:
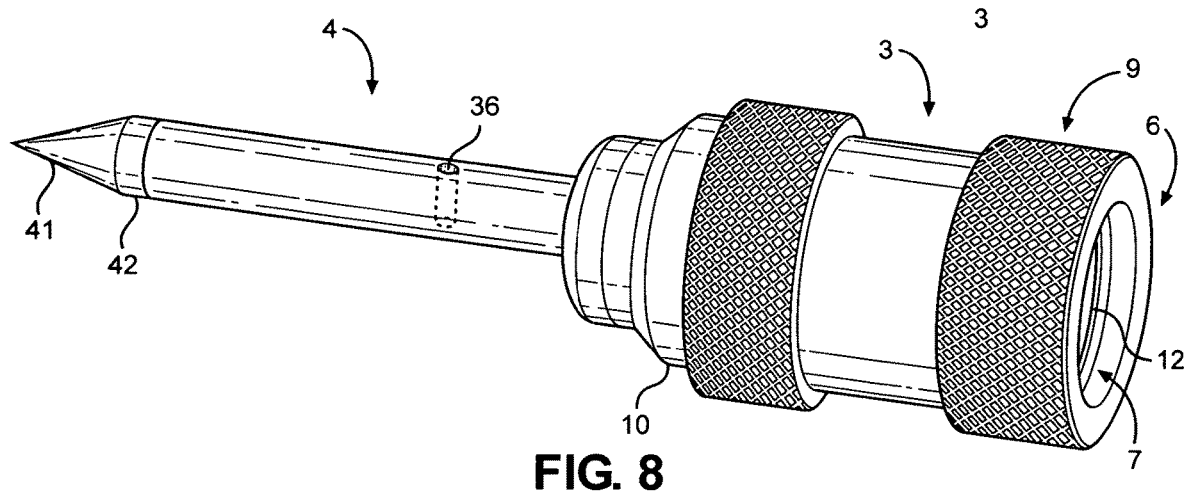
FIG. 8 is a perspective view of the a tire repair tool with the double knurled tool body.

In one embodiment, the knurled body 3 of the tire repair tool 1 has knurling on the outside circumference of its round body. The knurled body can have one knurled ring 9 or at least two knurled rings 9, 10 around the body 3 (FIG. 8). While the term "knurled body" is used throughout this specification for simplicity, the term "body" or "knurled body" is more accurately be referred to as a transmittal control section 3.

It should also be noted that the body 3 does not have to have knurling, and, in an alternative embodiment, the body can have a variety of other grip enhancing features, if so desired. The body 3 can range in size from about ½" to 2". The body can be larger or smaller and can be sized to comfort or need, depending on the size of the hand of the user, comfort factors, and the size of the item(s) being inflated.

While the body 3 is described as circumferentially round, in alternative embodiments, the body, or more correctly its cross section or circumference, can have any number of polygonal shapes . . . . In one embodiment, any or all of the main parts, such as the cartridge, the body, and the insertion tube 4 can be made of metal, plastic, or a combination thereof. In one embodiment, the materials used in the manufacture of the knurled body 3 and the insertion tube 4 need to withstand higher pressures and lower temperatures, as compressed gases are, of course, under pressure and are usually much colder than the surrounding environs. The gas cartridge 2 can be of almost any length. What is important is that the cartridge 2 and the body 3 be able to mate. In other circumstances, and in other embodiments, described infra, the body 3 has a mount for attachment of an air hose. All embodiments of the air body have an air passageway 12 which allows the air or $CO_2$ of the cartridge 2 to pass through the body 3 and out through a hose or an insertion tube 4.

In the present embodiment, there is a first female threaded section 7 inside 5 of the distal end 6 of the knurled body 3. This first female threaded section 7 mates with and threads with male threads 8 on the gas cartridge 2. The gas cartridge 2 is thus firmly affixed to the knurled body 3. While threaded sections are shown in the figures, the gas cartridge 2 can be mated to the knurled body by different means, including snap fittings, locking mechanisms, etc. It should be noted that almost any gas (such as nitrogen) can be used in the gas cartridge 2, as long as the gas does not adversely affect the item into which the gas is to be filled. The gas used should also not adversely affect the tire repair tool 1. Gases including but not limited to carbon dioxide or air can be used. It should also be noted that the gas cartridges 2 can also include a pressurized liquid, which in some circumstances can be used to repair a tire. An example of using both liquids and gases in combination would be inflating a tire through the injury using a combination of $CO_2$ and sealant. This is much faster than repairing a tire through the valve which requires the time consuming task of removing the "core" from the valve stem to inject the sealant, replacing the core, and then inflating the tire through the valve, risking the possibility that the valve can get clogged from the sealant, dust and dirt, etc.

A cartridge seal 11 fitted over the proximal end of the threads of the cartridge 2 serves to seal the gas or pressurized liquid within the cartridge until needed. The cartridge seal 11 is usually made of steel, which is the "standard" in the industry, although some other metal coverings may be used.

Figure 11:
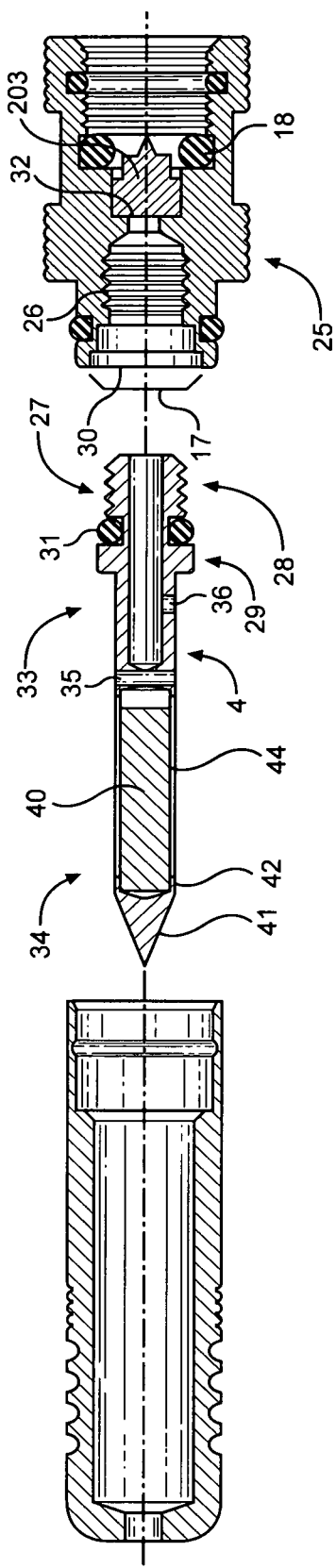
FIG. 11 is an exploded cross sectional view of one embodiment of the tire repair tool.

Referring to FIG. 11, the insertion tube 4 is connected to the proximal end of the knurled body 3. Referring to FIGS. 6 through 10, the insertion tube 4 has, at its distal end 27, male threads 28 which are threaded into threads 26 within the proximal end 25 of the knurled body 3. In one embodiment, the insertion tube 4 has a collar 29 below the threads 28 which fit within the proximal opening 30 of the knurled body. There is an "o" ring 31 which fits tightly on top of the collar 29 and tightly around the female threads, thereby preventing or limiting air, gas, or liquid leakage. It should be noted that while threads are described to connect the insertion tube 4 to said body 3, any form of connection can be used for attachment, as long as the insertion tube 4 does not come off when air passes through the body 3 into the insertion tube 4. In another embodiment, the insertion tube 4 is "permanently" or integrally attached to the body 3.

Figure 3:
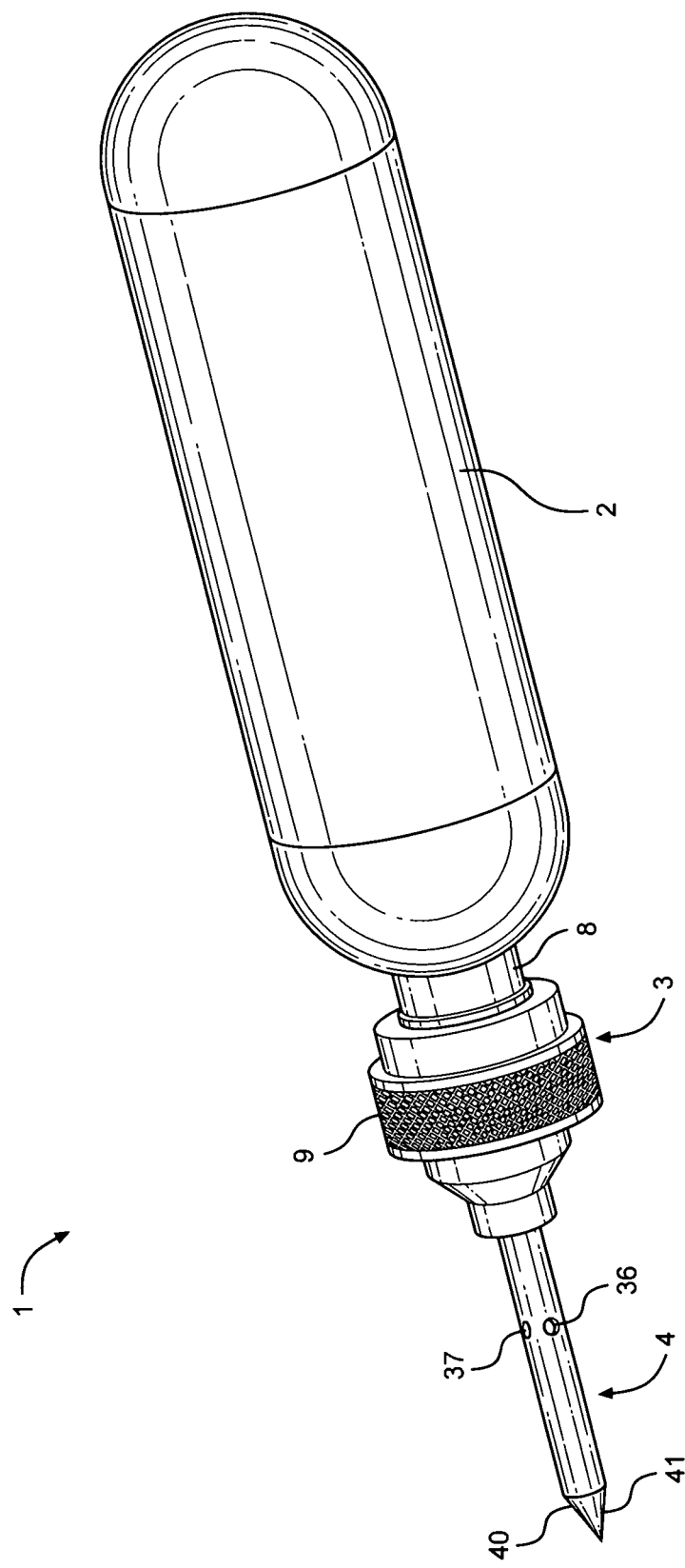
FIG. 3 is a side perspective view of the tire repair tool.
Figure 4:
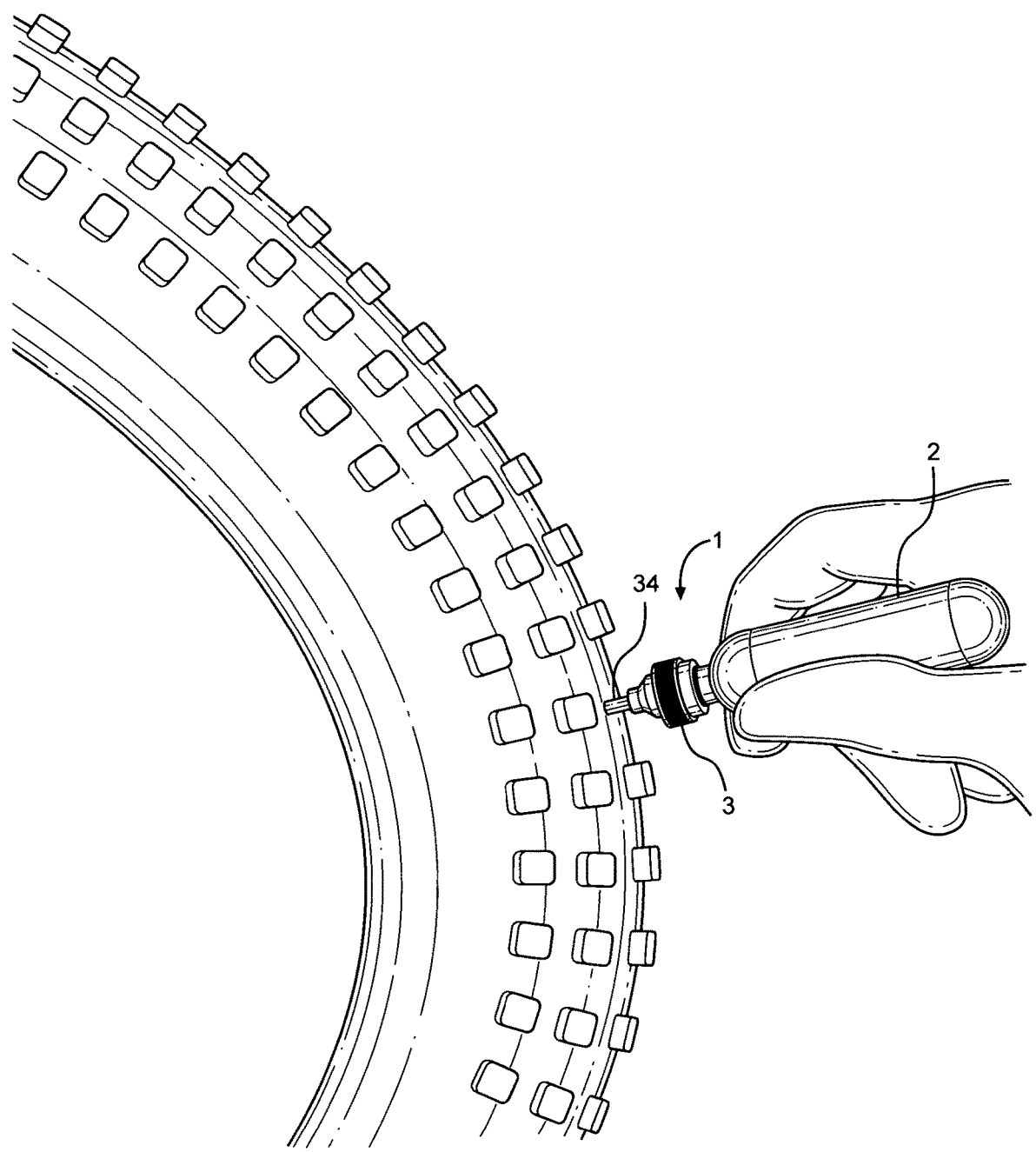
FIG. 4 is a front perspective view showing the tire repair tool with the tire plug inserted into a bicycle tire, with the user wearing a glove.

In one embodiment, the insertion tube 4 has an upper section 33 and a lower section 34, separated by an air impermeable wall or solid barrier 35. The wall 35 can be made of any material compatible with the insertion tube 4, but is normally made of the same material as the insertion tube 4. As such, in one embodiment, the wall is integrally molded with the wall 35. The upper section 33 has at least one hole 36, and in another embodiment, two holes 36, 37 through which the $CO_2$ gas, other gas (es), or combinations of liquids and gas flow(s) to inflate the tire (FIG. 3). In yet another embodiment, there are a plurality of holes through which the gases and/or liquids can flow. It should be noted that where the term "gas" or "air" is used throughout this disclosure, the terms can be inclusive of gas, air, liquid, and any combination thereof "Air" passageways referred to in this disclosure can allow for the passage of air, gas, liquid, or any combination thereof.

In one embodiment, (Seen in FIGS. 9, 10 and 2, 3, 7) lower section 34 has an opening 38 at its proximal end 39. Within the opening 38 there can be fitted with at least one repair plug 40 (as described in U.S. Pat. No. 8,707,829, issued Apr. 29, 2014, and U.S. Pat. No. 9,067,368, issued Jun. 30, 2015, both incorporated herein by reference in their entirety.) (FIGS. 2, 3, 7, 9, 10, 11, and 18) The repair plug 40 comprises a pointed conical metal tip 41 ending having at its distal end a circumferential shoulder 42 and a tip collar 43 positioned proximally to the circumferential shoulder 42. A rubberized impregnated cord 44 is attached to an inside of a distal end of the conical tip 41.

Figure 6:
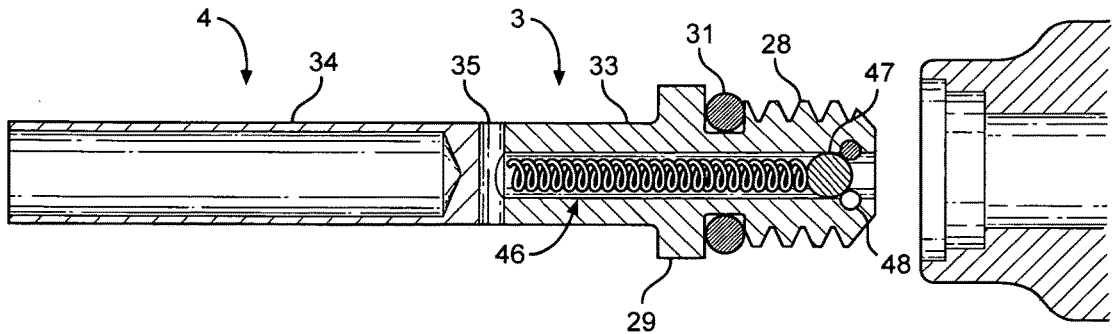
FIG. 6 is another cross-sectional view of another part of the tire repair tool.
Figure 7:
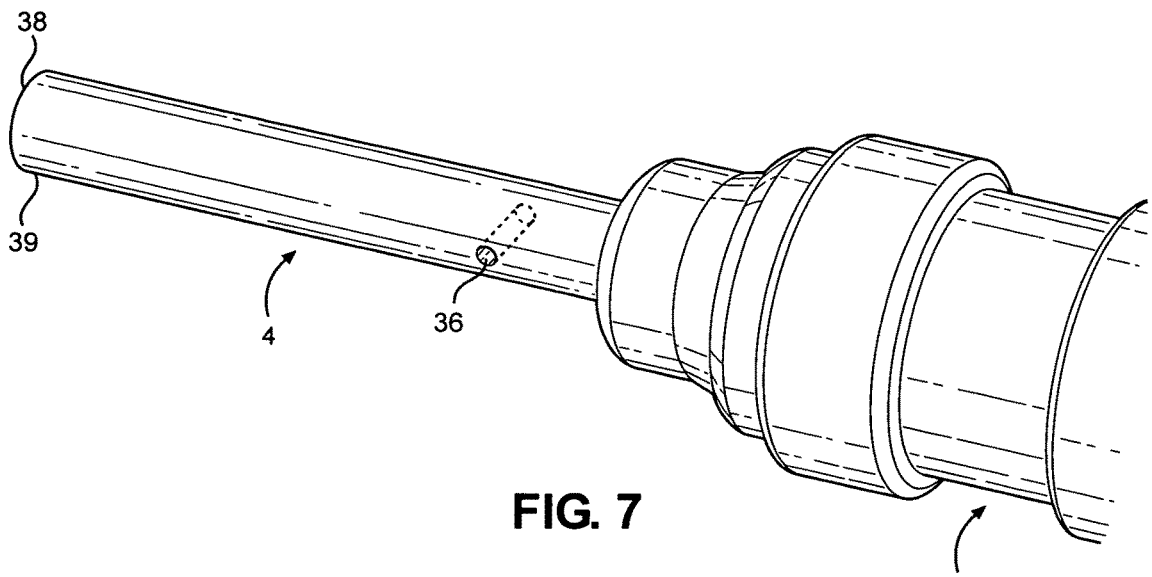
FIG. 7 is a perspective view of the front section of the tire repair tool.

Referring to FIGS. 6 and 9, in another embodiment, there is a reverse blocking valve 300 in the upper section 33 of the insertion tube 4. In one embodiment, the reverse blocking valve is formed by a resilient member such as a check valve compression spring 46, and a ball bearing seal 47 on top of the valve compression spring 46. On top of the ball bearing seal 47 is an O-ring seal 48 for the positioning of the ball bearing seal 47 and on top of the O-ring seal 48 is a threaded ring stop 49, which is then screwed into an inside threaded channel 50 of the insertion tube 4 has at its distal end 27. This reverse blocking valve prevents the loss of tire pressure during a pressurized cartridge change, if necessary, such that the air from the higher air pressured tire is prevented from escaping by the ball bearing seal 47 pushed up against the O-ring seal, preventing air from escaping.

In one embodiment, the insertion tube 4 could be anywhere from ¾" to 6" or more long. For example, in one embodiment, when in use with larger tires, the insertion tube 4 is longer. In another embodiment, the insertion tube 4 is ¾" to 4" long, and in another embodiment, the insertion tube 4 is from about 1" to about 3" long. Sizes may vary outside of these parameters.

In order for the gas to be released from the cartridge 2 and travel through the body 3, the seal 11 securing the pressurized gas in the cartridge 2 must be broken . . . . A number of structures may be used that allows for the piercing of the gas cartridge seal 11.

Figure 5:
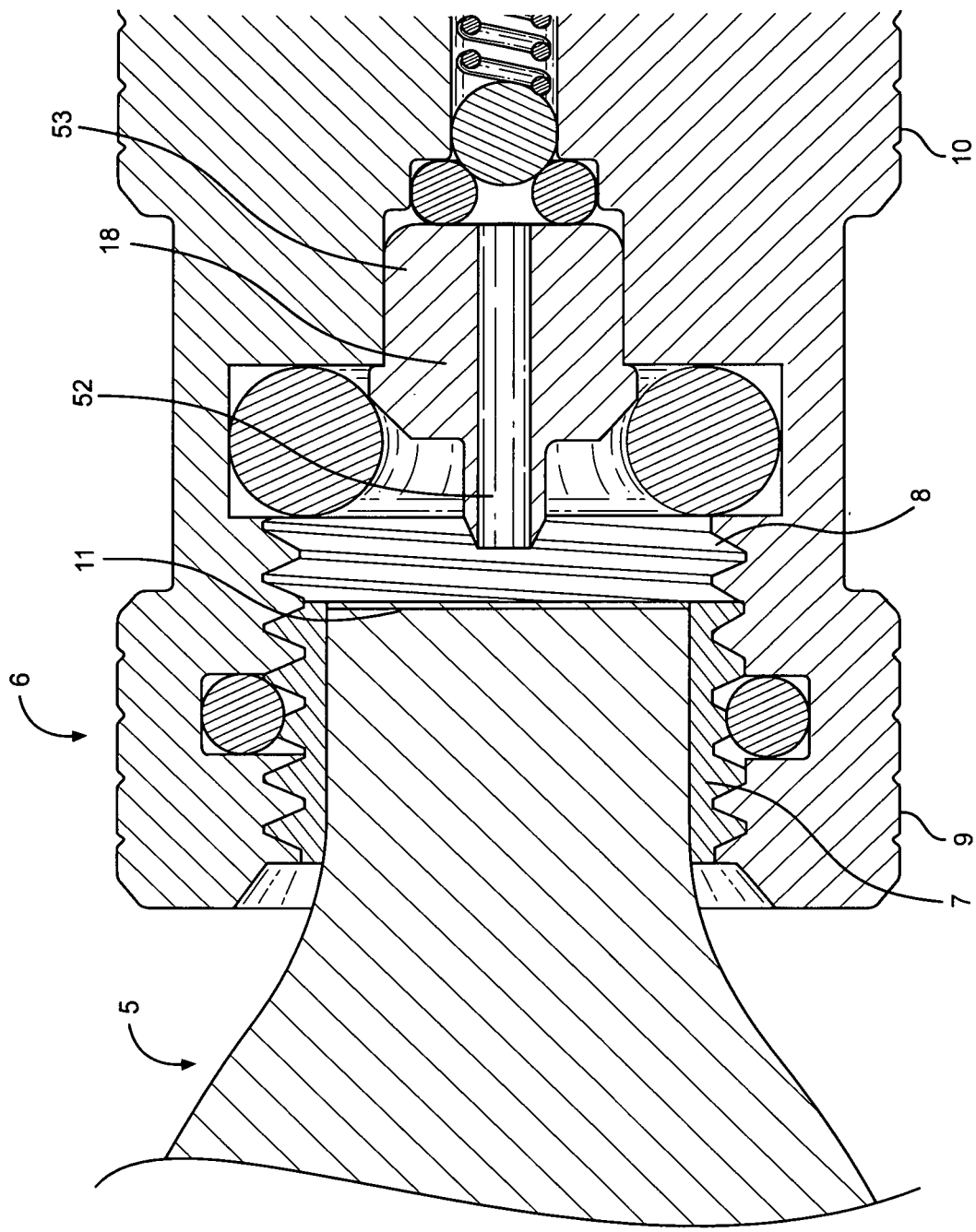
FIG. 5 is a cross sectional view of one embodiment of part of the tire repair tool.

In one embodiment, as shown in FIG. 5, the knurled body 3 comprises a cartridge tip piercing component 51 having a hollow pin 52 extending through the cartridge tip body 53. The hollow pin 52 extends far enough such that when the gas cartridge is threaded far enough into the knurled body 4, the hollow pin pierces the cartridge thread seal. When the seal 11 is pierced, the $CO_2$ passes directly from the gas cartridge 2 through the cartridge tip piercing component 51, and through the insertion tube 4. In one embodiment, the end of the hollow pin is at an angle to make piercing the seal easier.

Figure 12:
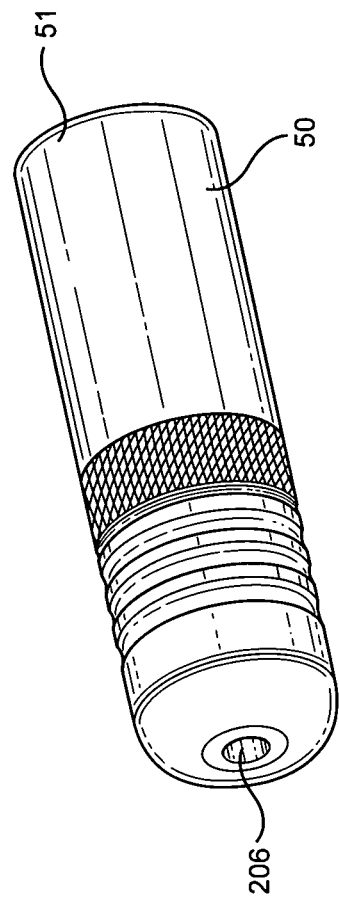
FIG. 12 is a perspective view of a cap that fits over the lower end of the tire repair tool.
Figure 13:
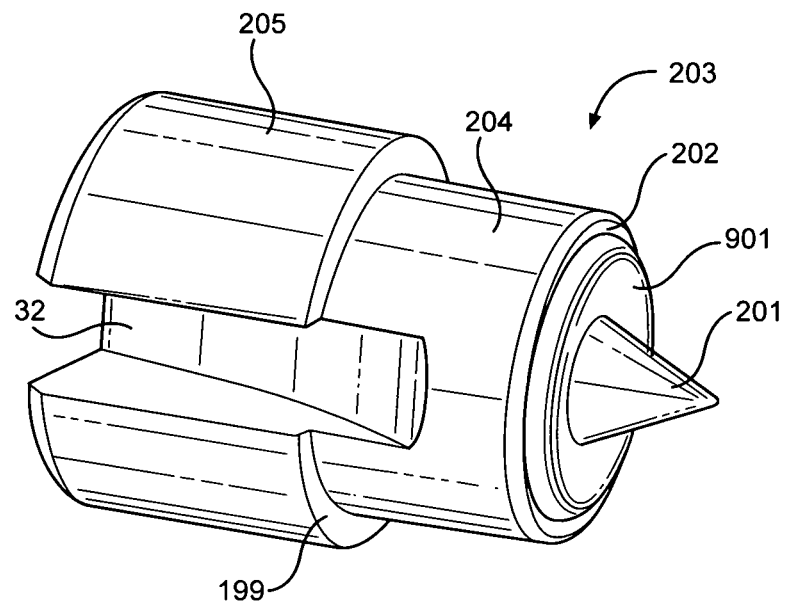
FIG. 13 is a perspective view of the cartridge tip piercing component.
Figure 14:
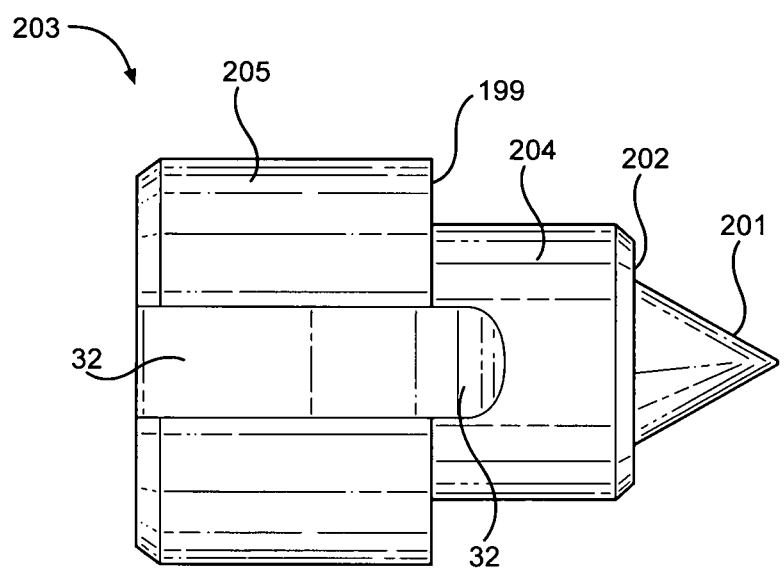
FIG. 14 is a side view of the cartridge tip piercing component.

FIGS. 9 and 11-15 are directed towards another embodiment that efficiently releases and conserves the $CO_2$ gas in the cartridge. FIG. 13 illustrates a cartridge tip piercing component 203 having a continuous air groove 32 in the shoulder 204 and elongated body 205. There is a piercing tip shoulder rim 202, as well as an elongated body rim 199. In FIG. 13, there is also an O-ring 901.

More specifically, FIG. 9 shows the placement of the cartridge piercing component 203 within the tool 1. When the cartridge is screwed into the body, the conical piercing tip 201 of the cartridge tip piercing component 203 efficiently and easily pierces the flat steel seal or flexible seal 11 covering one end of the cartridge 2, so that pressurized gas can flow from the cartridge 2, through the body 3, and through the insertion tube 4 and into the tire or the item being inflated. However, if the canister is continuously rotated clockwise, the seal and/or solid rim will be positioned against the piercing tip shoulder rim 202, which will effectively prevent air from escaping through the cartridge 2. The O-rings 901 and 18 help prevent any incidental leakage from escaping from the tool or from going through the body 3 out the insertion tube.

In another embodiment of the tip piercing component, there is a groove 900 around the shoulder rim 202 where an O-ring 901 is fitted. The continuous air groove 32 which allows for air to flow from the cartridge 2 to the body 3 and through the insertion tube begins at the base of the shoulder 204. FIG. 11 shows the cartridge piercing component 203 in use without the groove 900 and without the O-ring 901. This is shown in FIGS. 9, 15a, and 15b.

Figure 15A:
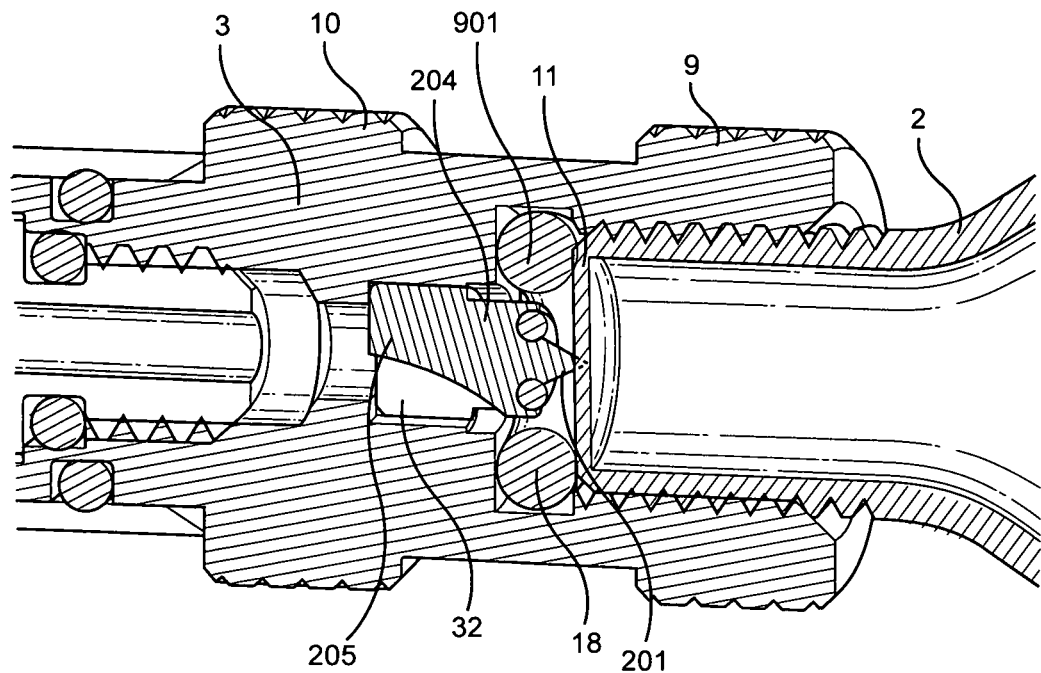
FIG. 15a is a cross section of the tire repair tool showing tip piercing component in the open position allowing for the flow of air.
Figure 15B:
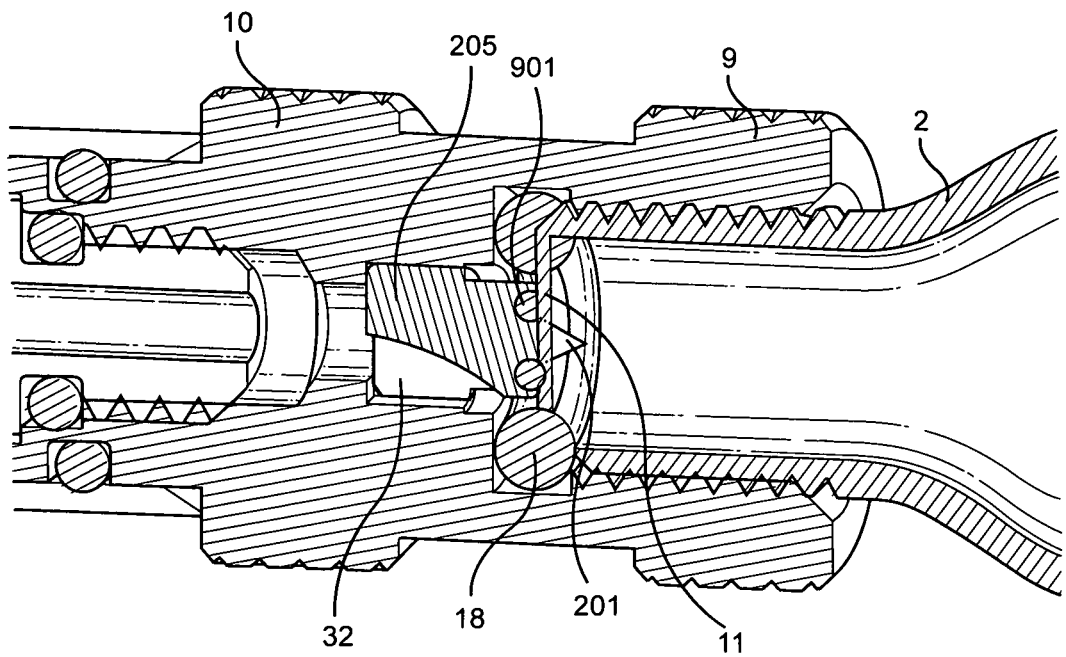
FIG. 15b is a cross section of the tire repair tool showing the tip piercing component piercing the seal and penetrating the cartridge in the closed position.

FIGS. 15a and 15b illustrate the effectiveness of the cartridge piercing component in preventing undesired loss of $CO_2$ from the cartridge. FIG. 15a shows the air passageway as the seal 11 is being pierced by the conical piercing tip 201, just when the gas cartridge 2 is threaded clockwise, but not so far as to cut off air flow. The arrows in the FIG. 15a shows the passage of air from the cartridge 2 and through the continuous air groove 32 and down through the insertion tube.

As shown in FIG. 15b, when the cartridge is rotated clockwise a bit more, the seal 11 is fit tightly against the piercing tip shoulder rim 202. The opening pierced by the conical piercing tip 201 effectively plugs the very hole it created. O-rings 18 and O-ring 901 act to prevent any other possible leakage from metal and plastic imperfections. To allow air to flow from the cartridge 2, the body 3, and eventually out through the insertion tube 4, the cartridge 2 is rotated counter clockwise until the cartridge 2 is backed far enough away from the cartridge piercing component 203 to allow gas to flow from the cartridge 2, through the continuous air groove 32 and eventually out through the insertion tube 4 or other attachment to the body 3.

When the tire repair tool 1 is inserted into the tire either prior to or after the seal 11 is pierced by the conical piercing tip 201, the insertion tube 4 is entirely or almost entirely within the tire. In one embodiment, the $CO_2$ cartridge 2 is screwed into the knurled body 3, wherein the conical pierce tip 201 of the cartridge tip piercing component 203 pierces the cartridge seal 11 covering the threads 8 of the proximal end of the CO2 cartridge 2. The compressed gas begins to flow through the tire repair tool 1 including through the insert tube 4, and into the tire. If more air (gas) is needed, the $CO_2$ cartridge 2 can be unscrewed and replaced with a fresh cartridge. If enough gas has been used, the cartridge can be rotated clockwise to cut off the flow of gas from the cartridge 2. In one embodiment, an insertion tube cover 50 fits over the insertion tube, and in another embodiment, the distal end 51 fits up against the knurling 9 of the knurled body 3. There are a number of possible embodiments so the insertion tube cover 50, as shown in FIGS. 12 and 13. The insertion tube cover 50 is not a necessity, but it does protect the insertion tube when it is connected to the body 3, and it can be removed when the repair tool 1 is needed. Additionally, in the event of a bicycle crash, the insertion tube cover 50 helps prevent impalement or other injury by the brass or other tip materials, when a cyclist is carrying the tool in their pocket or on their person.

A hole 206 in the proximal end of the insertion tube cover 50 allows air to escape if, in an extremely unusual situation, a gas cartridge 2 loosens. Similarly, without hole 206, if someone intentionally opened a valve to test it, pressure could build inside the cap, potentially creating a dangerous projectile which could cause harm or injury. The hole 206 in the insertion tube cover 50 prevents this possibility.

Figure 16:
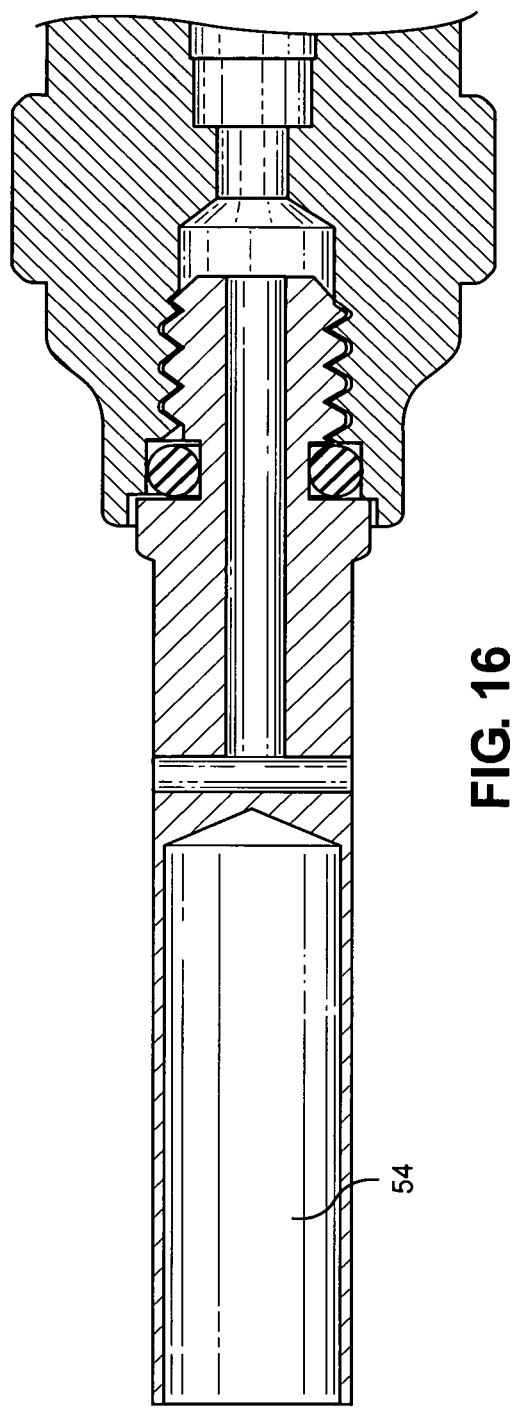
FIG. 16 is a cross section of the tire repair tool having a large insertion tube.
Figure 17:
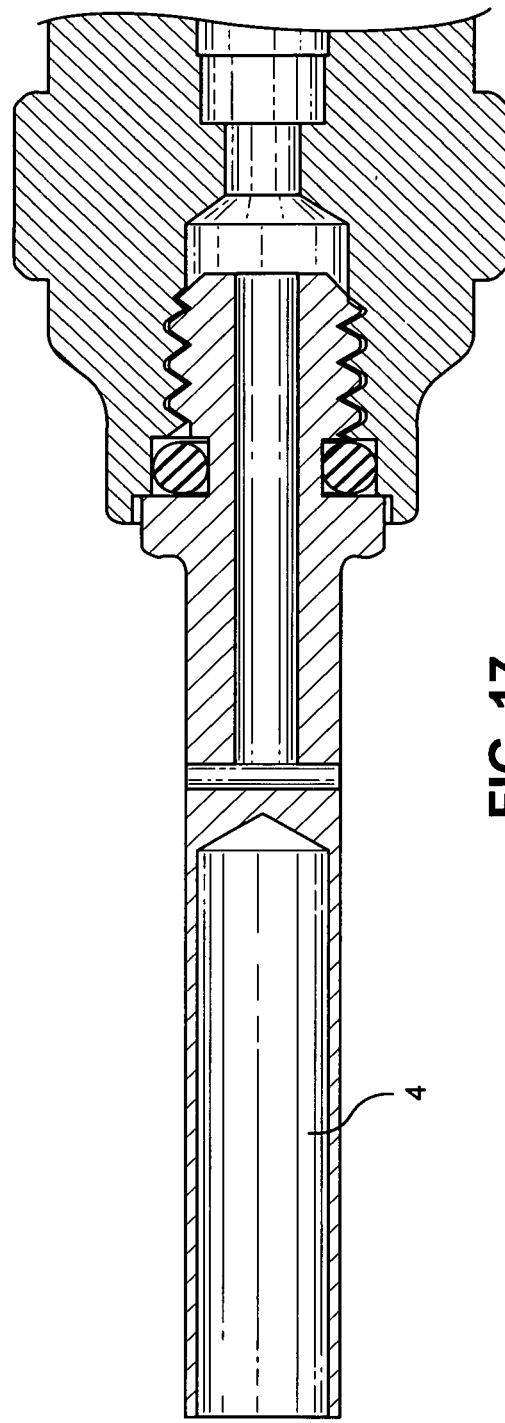
FIG. 17 is a cross section of the tire repair tool having a standard insertion tube.

Once the tire is inflated, the tire repair tool 1 is withdrawn. Because the shoulder of the conical tip 41 may be the same size or fractionally larger than the insertion tube 4, the conical tip 41 with the repair plug 40 easily separates from the insertion tube 4 as the insertion tube 4 is withdrawn, allowing filling the hole in the tire by the repair plug 40, thereby preventing air leakage. The tire is thus inflated and repaired FIGS. 16 and 17 are cross sections of two different insertion tubes 54 and 4. Insertion tube 54 is a large insertion tube and insertion tube 4 is a normal sized insertion tube. In one embodiment, the part of insertion tube 54 that connects to the body 3 is the same size as that of insertion tube 4 but the tube holding the insertion tube is wider. For instance, the large insertion tube 54 accommodates a large repair plug 57 and can be from about 0.15 to about 0.22 inches wide, while the plug for the "normal" sized insert tubes can range from about 0.10 to about 0.14 inches wide as measured on the inside. The length of the repair plug can range from about 0.7 inches to about 1.5 inches. In some embodiments, the plug can be longer such as for heavy duty bus or truck tires.

FIGS. 18-22 represent a variety of different embodiments of the disclosure and of the attachments to the proximal end of the knurled body 3.

Figure 18:
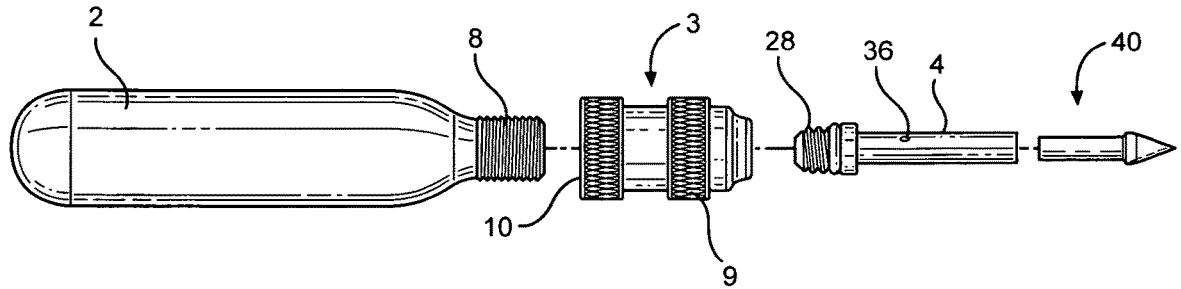
FIG. 18 is an exploded view of the tire repair tool.
Figure 19:
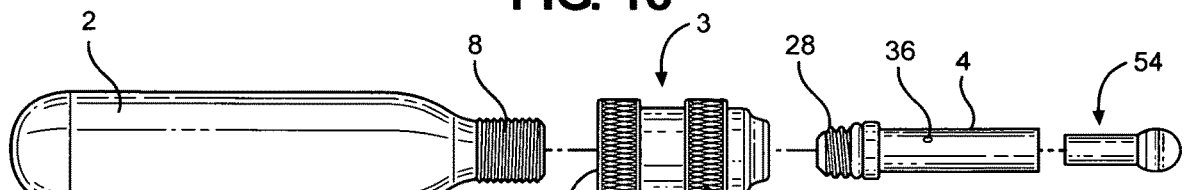
FIG. 19 is an exploded view of the tire repair tool having the larger repair plug with a larger insertion tube.

FIG. 18 is an exploded view of the tire repair tool, as described with the normal sized insertion tube 4 with a regular repair plug 40. FIG. 19 is an exploded view of the tire repair tool having the larger repair plug 57 with a large insertion tube 54, which is used for larger holes as described supra.

Figure 20:
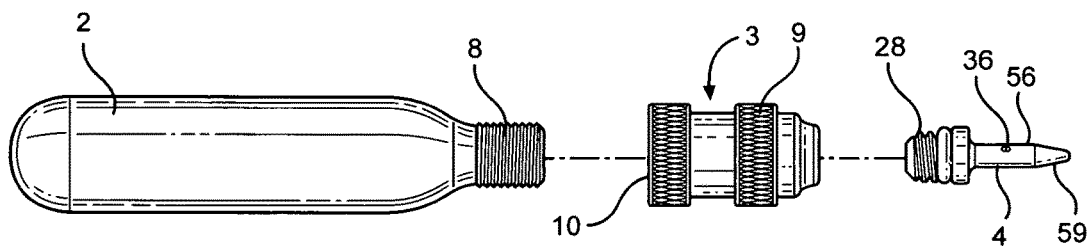
FIG. 20 is an exploded view of the tire repair tool for a tire repair tool having an inflation only tip.

FIG. 20 shows an exploded view of a repair tire tool with an inflation only insertion tube 56. In this embodiment, the inflation only tip 56 allows inflation through a cut or puncture injury in the tire. In one embodiment after the tire is filled with air, gas, liquid, or a combination thereof, the tire can be repaired using the plug system described in the patents cited, supra. More specifically, in the embodiment shown in FIG. 20, the tip of the insertion tube is blunt, not sharp.

Figure 21:
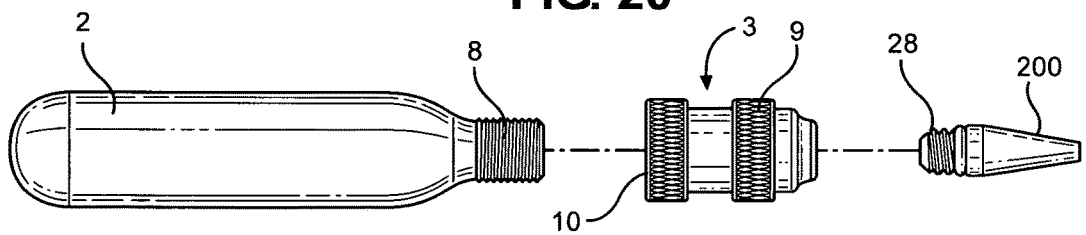
FIG. 21 is an exploded view of tire repair tool having a larger inflation only tip.
Figure 22:
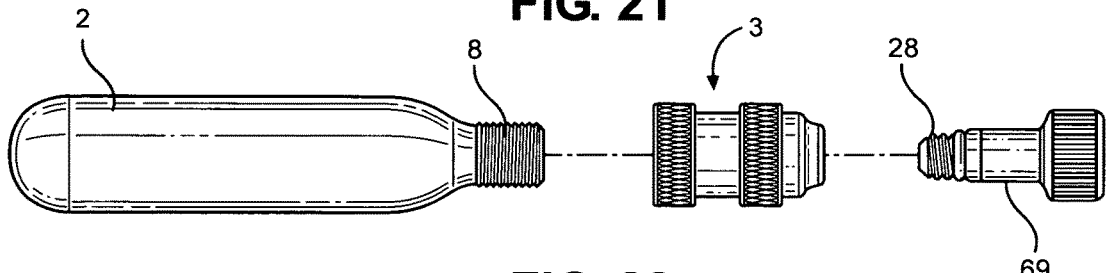
FIG. 22 is an exploded view of the tire repair tool with an adapter that works to inflate tires with either a Presta or a Schrader valve stem.
Figure 24:
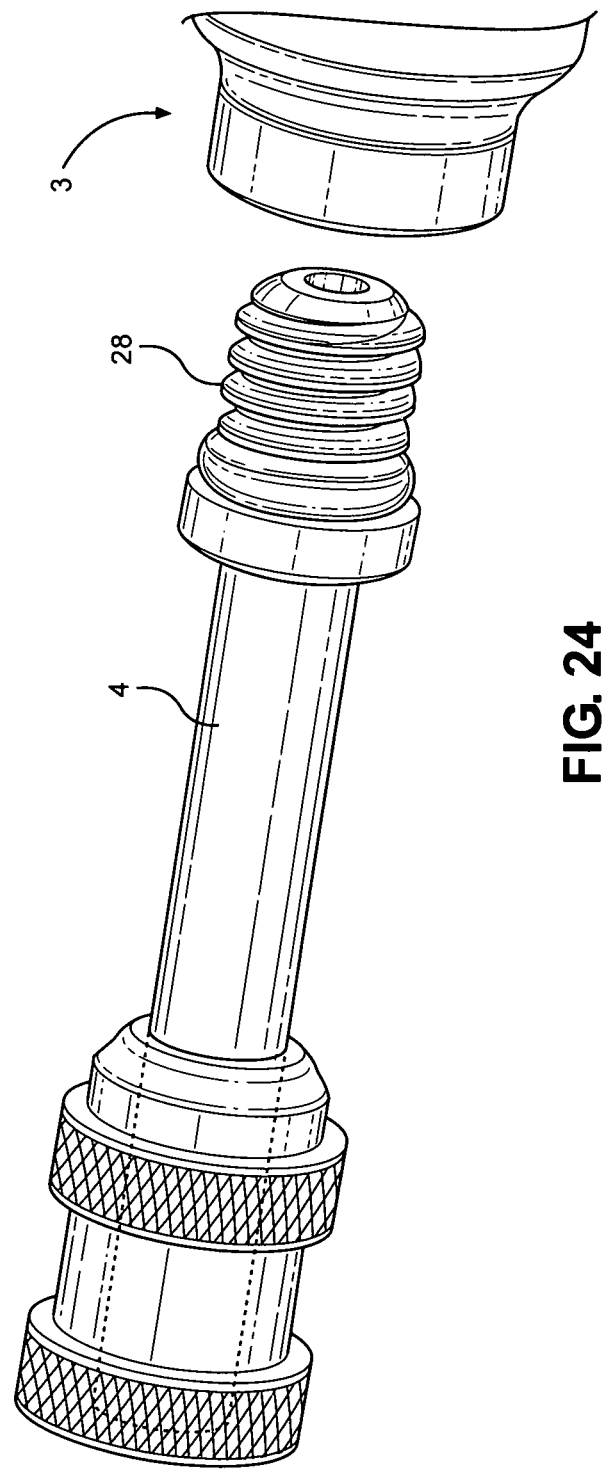
FIG. 24 is a perspective view of a tire repair tool with a Schrader or Presta adapter.

FIG. 21 is an exploded view of the tire repair tool having a large inflation only tip, also known as an oral inflation valve 200. The tip is just an open passageway, with no impediments. This tip has the ability to fill inflatable life jackets and other pneumatic flotation devices by just inserting the tip into the flip up valve. FIG. 22 is an exploded view of the tire repair tool with an attachment that adapts the inflation cartridge to inflate tires having Presta/Schrader valve stem 69 (also referred to as an American/French valve stem). FIG. 24, is another angular view of the tire repair tool showing another embodiment allowing a different inflation tool for use for inflation of a tire through a Presta/Schrader valve stem.

Figure 23:
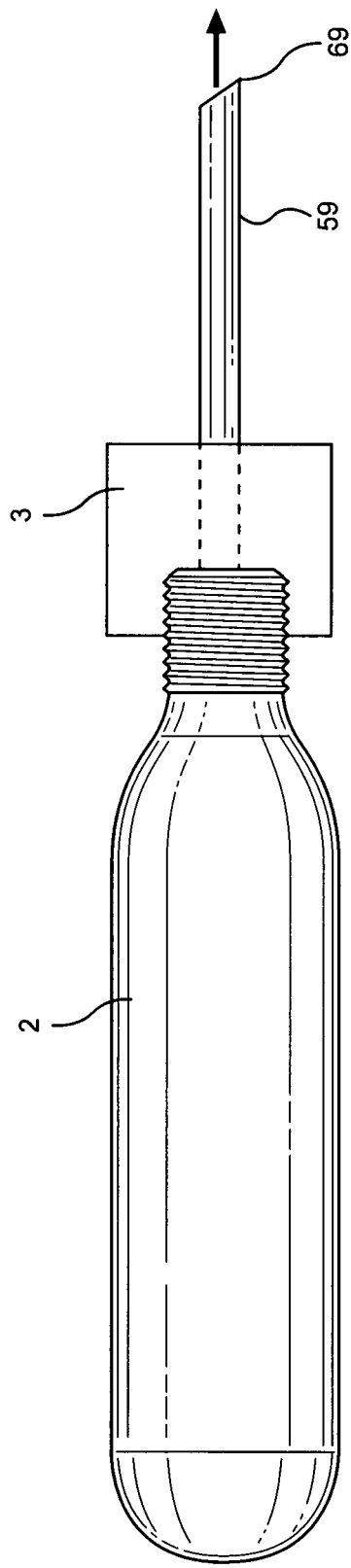
FIG. 23 is a side view of a tire repair tool with a puncturing tip.

Referring to FIG. 23, in contrast to inflation of a tire through a valve stem, the proximal insertion tube 59 ends in a sharp slanted point to allow for the tube to push through the wound in the tire and fill the tire with air.

It should be noted that the threaded attachment for each of the various attachments or various insertion tubes is the same as it is for the insertion tube in FIG. 18.

Figure 25:
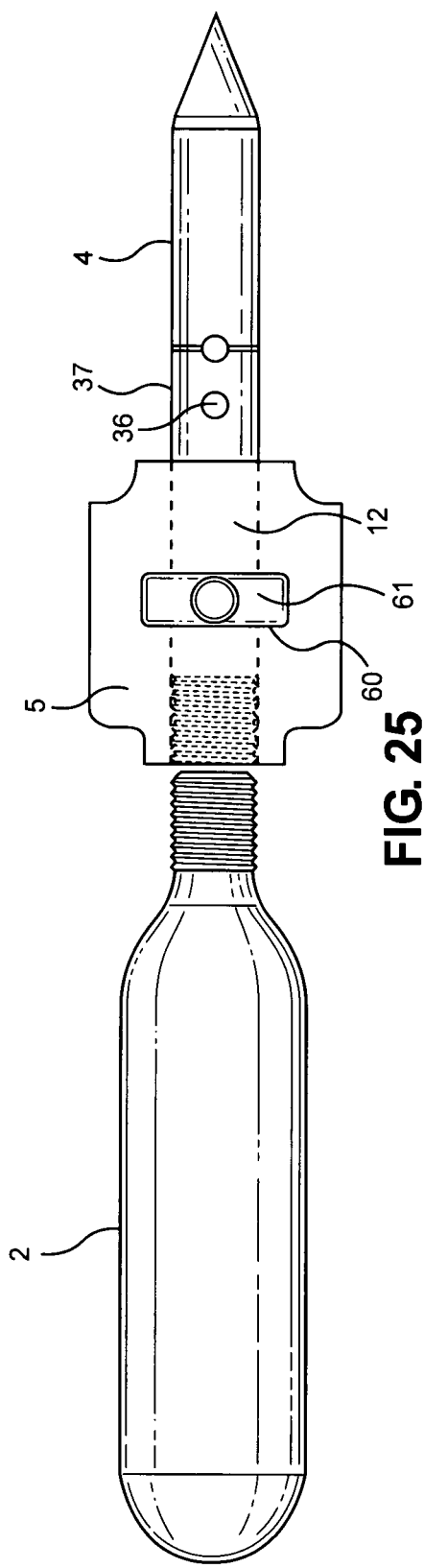
FIG. 25 is a side view and partial cutaway view of another embodiment of the tire repair tool having a ball valve lever to open and shut off the flow of $CO_2$ gas.

In some situations, it is not necessary to use all of the gas in the gas cartridge, while at the same time the user or customer does not want to keep screwing and unscrewing the air or $CO_2$ cartridge 2 to control air flow. In such situations, and in the embodiment found in FIG. 25, a ball or globe valve 60 is positioned along passageway 12 on the inside 5 of the knurled body 3. Other valve systems could be used. In one embodiment, the valve is fully integrated with the body 3, and the valve 60 is operated by the use of a ball valve lever 61. The valve is located below the cartridge tip piercing component 51 and above the insertion tube 4. In one embodiment, if the insertion tube 4 is long enough, the ball valve 60 can be positioned on the insertion tube 4 above holes 36, 37. Rotating the valve lever 61 90 degrees will commence or interrupt the flow of air, $CO_2$, or other gases through the air passageway 12 and out through the holes 36, 37 of insertion tube 4.

Figure 26:
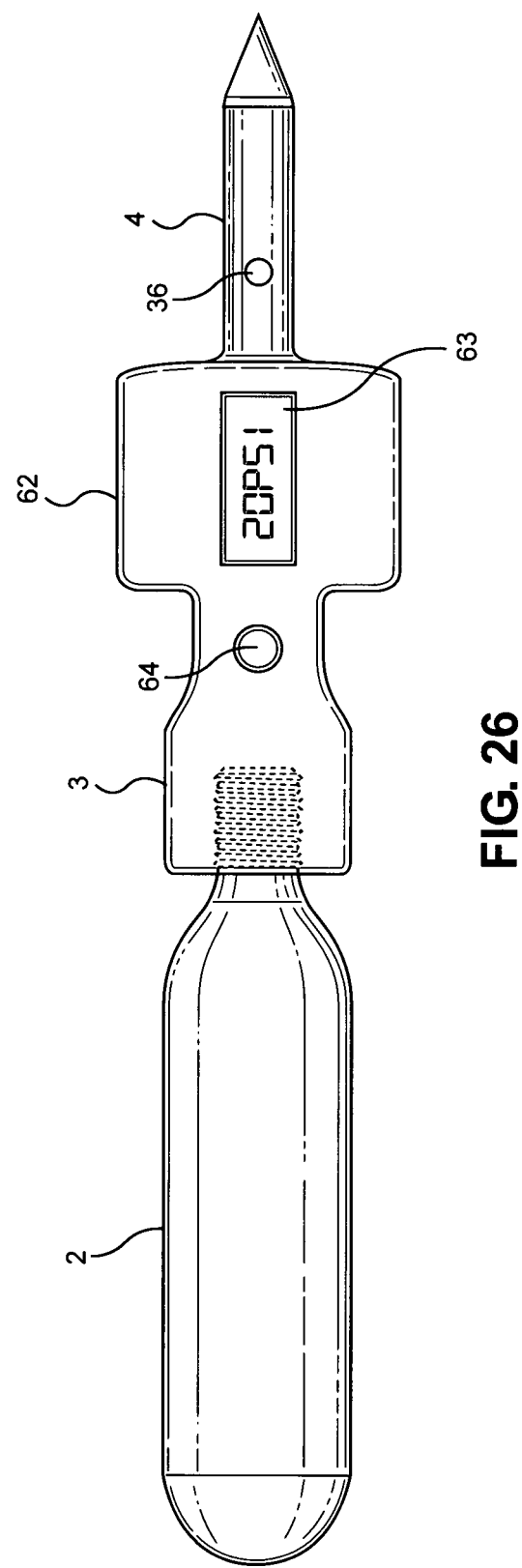
FIG. 26 is a side view and of another embodiment of the tire repair tool having a digital readout device.

In another embodiment (FIG. 26), the tool 1 includes a pressure gauge 62 with a digital readout 63 of the tire pressure measured in pounds per square inch or in kilograms per square centimeter or bar. The pressure gauge 62 is positioned as integral with and part of or attached to the knurled body 3. In one embodiment, the pressure gauge 62 is positioned at the distal end of the insertion tube 4 and at the proximal end of the knurled body 3. In one embodiment, bleed valve 64 is part of the pressure gauge 62 which allows for the release of air when the air pressure of the tire is too great. In another embodiment, the bleed valve 64 is not part of the pressure gauge 62. In one embodiment, the bleed valve 64 is positioned at or above the digital readout 63, although there may be variations of its position.

Another embodiment of the disclosure eliminated the need for having a hole 36 or holes 36, 37 in the side of the insertion tube 4. In this embodiment, the air or $CO_2$ through a hole 66 in a puncture tip 67. In this embodiment, there is no need for a barrier wall 35 in the insertion tube 4.

Figure 27A:
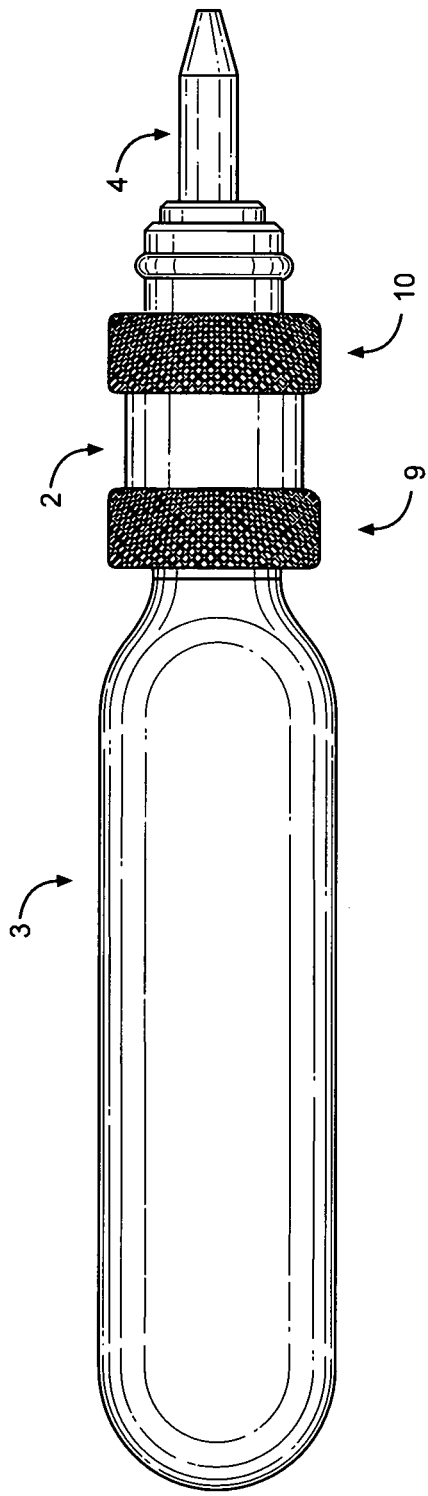
FIG. 27a is a side view of an alternative embodiment of the tire repair tool for use in inflating the tire only.
Figure 27B:
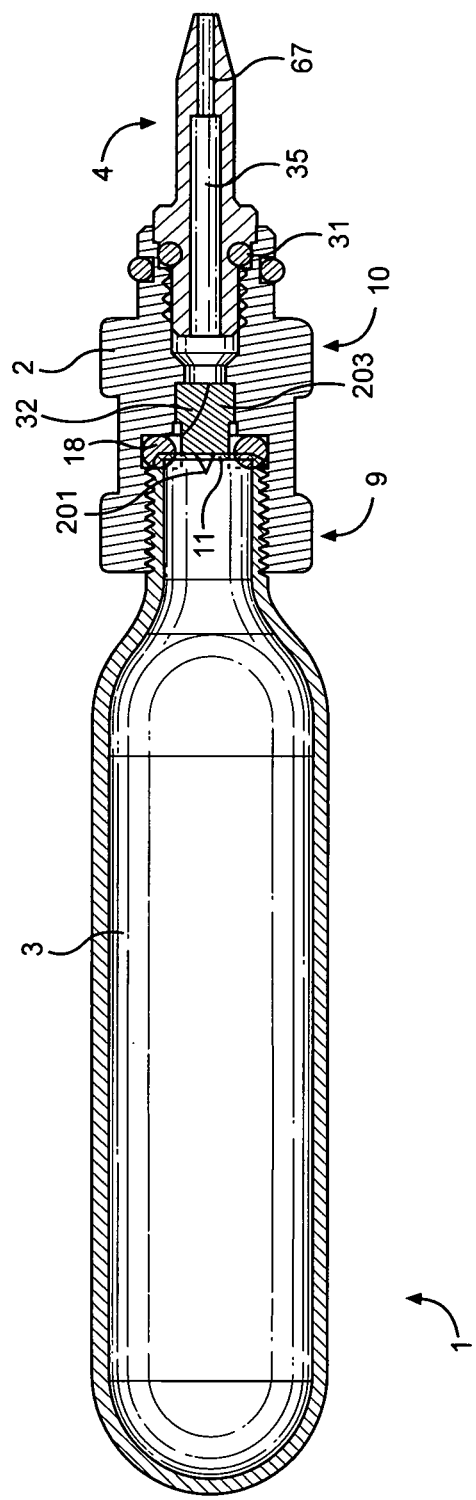
FIG. 27b is a cross sectional view of the alternative embodiment of FIG. 27b.
Figure 28:
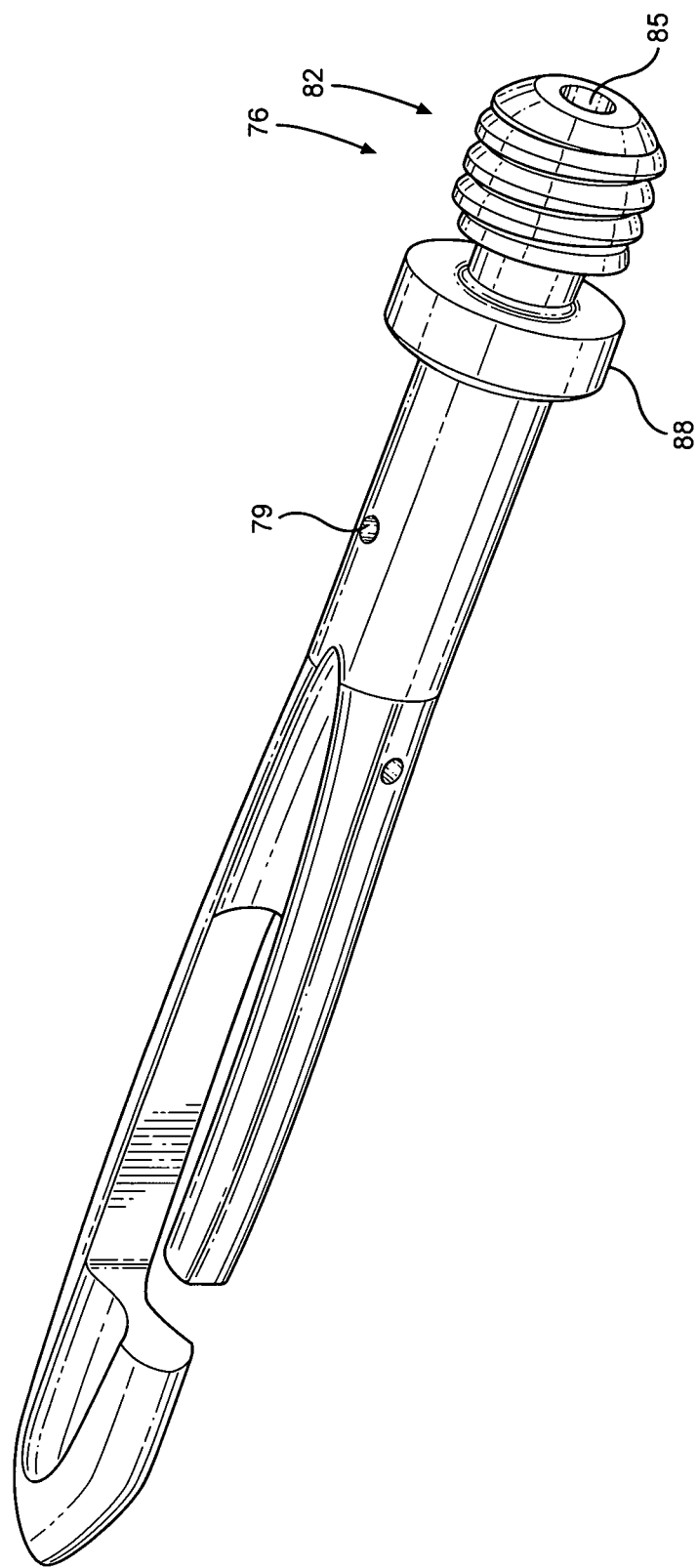
FIG. 28 is a perspective view of a plugger.
Figure 37:
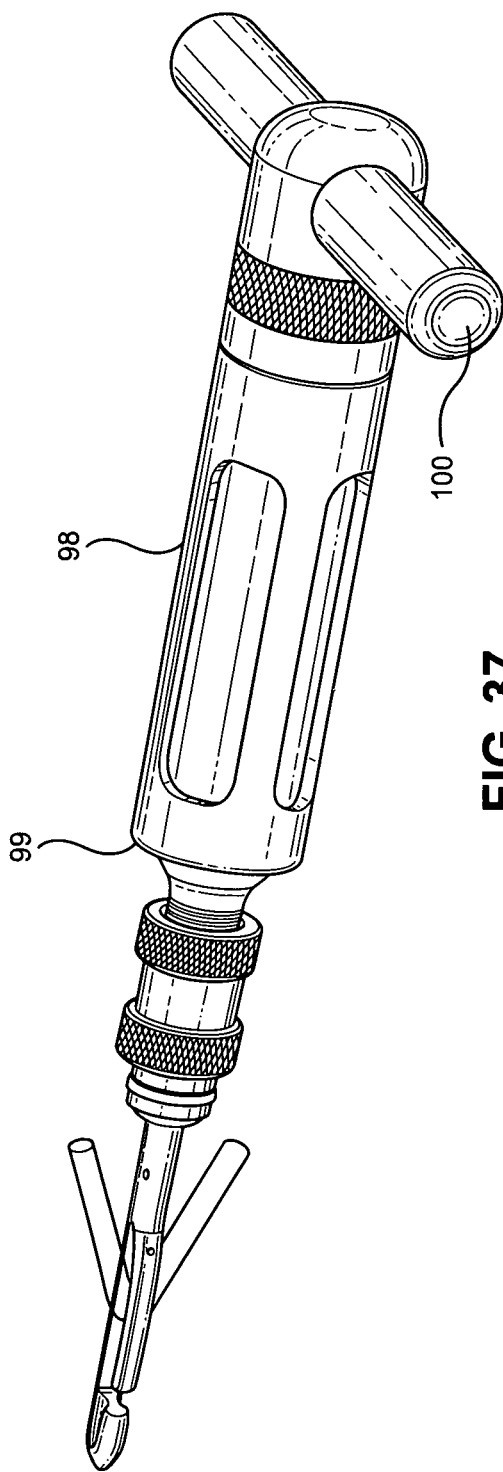
FIG. 37 is a perspective view of the repair tool with the cartridge sleeve and "T" handle with the use of a cord plugger.
Figure 38:
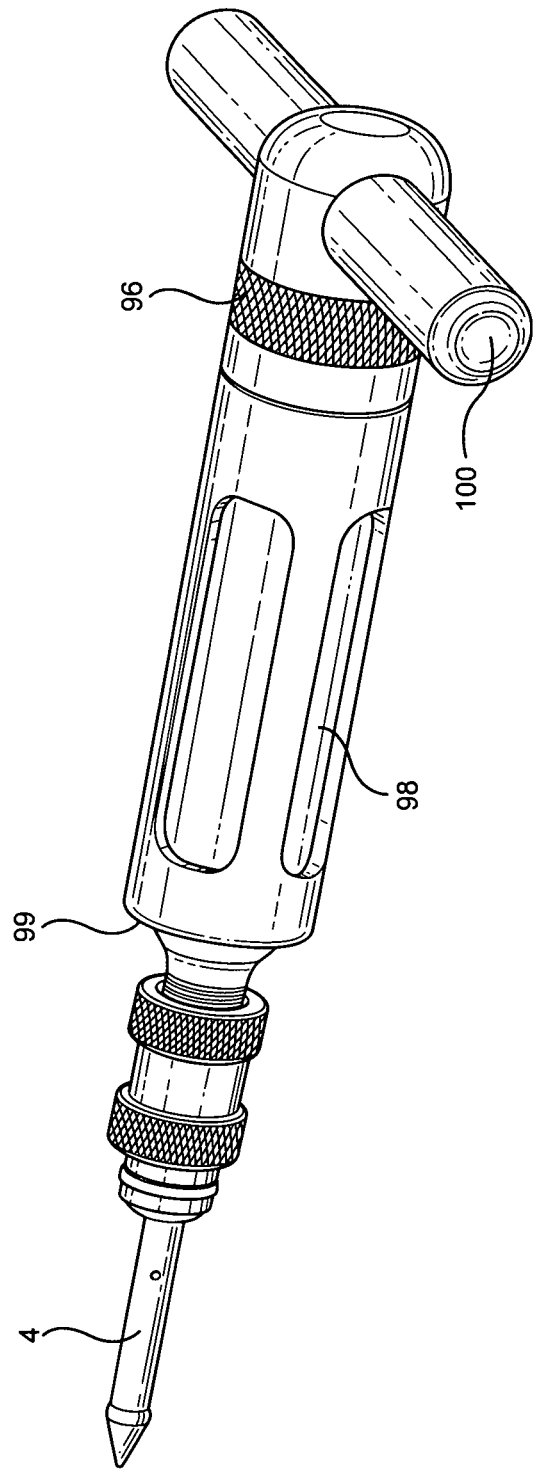
FIG. 38 is a perspective view of the repair tool with the cartridge sleeve and "T" handle with an insert tube.

In another embodiment (FIG. 27), there is a needle tube 67 which passes from an air passage way 35. The air passageway 35 extends from the distal end to the middle of the insertion tube 4 and helps channel air or $CO_2$ into the needle tube 67. In this embodiment, the needle tube 67 connects with and is integral with the opening 66 through the proximal end of the needle tube 67. The needle tube 67 can be connected to the air passageway 35 by a threaded connection, an O-ring at the proximal end of the passageway 35, or any other means known in the art. The tool is inserted into the tire to inflate it, and can then be withdrawn, whereupon hole can be repaired by any method. In yet another embodiment that is quick and easy, the tire can be repaired using a Dynaplug tire repair tool or any other tire repair kit after inflation.

In another embodiment, either integral with, wedged on or mated threaded on the proximal section of the insertion tube 4 are pluggers 76, 77, 78, (FIGS. 28-34), used to plug cord or some similar substance into a hole in a tire so as to plug a leak. In one embodiment, each of these pluggers incorporate or are integral with the insertion tube, with at least one hole 79, 80, 81 for the release of the $CO_2$, or gases, or liquid/gas combination into the tire or other inflatable item. In one embodiment, the distal end 82, 83, 84, of the pluggers have a threaded section 85, 86, 87 that is threaded into the proximal end of the knurled body 3, the threads being complementary to the threaded section of the body. A collar 88, 89, 90 limits the degree to which the plugger is threaded into the knurled body 3. The collar 88, 89, 90, may serve as an O-ring or may have an O-ring positioned on top of the collar to prevent air leakage. In one embodiment, the pluggers are integrally molded with or attached to the body 3.

In another embodiment, the proximal end of the insertion tube is threaded, and the pluggers, threaded at their distal end, such that the pluggers are attached to the insertion tube. In alternative embodiments, other means of attachment are available, including gluing, welding, wedging or any other means, here and throughout the description.

FIG. 33 shows one embodiment, wherein a plugger 76 is threaded into the body with the body attached to the canister. A filler cord 91 is positioned or wedged between tongs 92, 93. The plugger tip 94 is pushed in through the hole in the tire up to the distal end of the plugger 76 (or insertion tube 4). The gas cartridge 2 is screwed down, and the conical piercing tip 201 or pin 52 pierces the cartridge seal 11 and inflation gas flows from the cartridge 2, through the body 3, through the plugger 76 and out through hole 79 and into the tire. Once the tire is inflated, the plugger is withdrawn, and the cord 91, which is held by the tire by friction, fills the hole, limiting or preventing leakage. FIG. 33 shows the tool without the cord 91.

In another embodiment, the tire repair tool 1 has a cartridge sleeve 95. The cartridge sleeve 95 fits around and "grabs" the cartridge 2. In one embodiment, when the cartridge 2 is filled with gas, and when it passes through the body 3, and the temperature of the metal parts of the tool 1 may drop precipitously; consequently, it is recommended to use gloves when handling the tool. The use of the cartridge sleeve 95 negates or largely negates the need for the use of gloves, and the cartridge sleeve allows for easier manipulation of the tire repair tool 1, and in particular, the rotation of the cartridge 2.

In one embodiment, the body is made out of a high durometer or high density silicon. In another embodiment, the cartridge sleeve 95 is made out of a high quality plastic, or a hard rubber. In one embodiment, the cartridge sleeve could be slightly oversized (from about 3% to about 5%) to slide on the cartridge 2 easily but as soon as it is gripped with one hand, it would create an exceptional friction grip to rotate the cartridge 2 to allow for the release or closure of the flow of gas. In another embodiment, a lower durometer cartridge sleeve 5 is easily stretched over the cartridge 2. The cartridge sleeve 95 has a distal section 96, a middle section 98, and a proximal end 99. In one embodiment, the distal end has a hole 97 perpendicular through the distal section, with the hole being from ¼" to 1" and large enough to put a t-handle 100 through. The handle t-handle 100 can be made out of wood, steel, aluminum or any other rigid material that does not easily break. The handle 100 allows the plugger to be worked into the tire, as heavier larger tires often require that more force be applied to the tool 1 to work it into the tire.

In one embodiment, the middle section 98 has a plurality of openings 101, 102, 103 which are positioned around the gas cylinder 2. In another embodiment, there are no openings. The purpose of the openings 101, 102, 103 are to give the cartridge sleeve 95 enough flexibility to be fitted over the cartridge 2.

In one embodiment, the proximal end 99 of the cartridge sleeve 95 has a circumference 104 that grips the gas cylinder/cartridge, such that the cartridge sleeve 95 will not slip when positioned on the cartridge 2.

In another embodiment, the distal end 96 of the cartridge sleeve 95 is solid or dense 105 (with the exception of the hole 97). In one embodiment, the distal end of the cartridge sleeve terminates in a v-rest 106 in which the distal end of the cartridge 2 resides. The cartridge can be rotated by firmly grasping the cartridge sleeve and rotating or turning the cartridge until the seal 17 is punctured. Furthermore, the solid section 105 of the cartridge sleeve 95 helps ensure that the rotation of the t-handle 100 will not result in undue wear and tear on the cartridge sleeve 95.

It should be noted that either a regular insertion tube 4 with a repair plug 40 can be attached to the body 2 or a plugger of any sort may be used.

Figure 39:
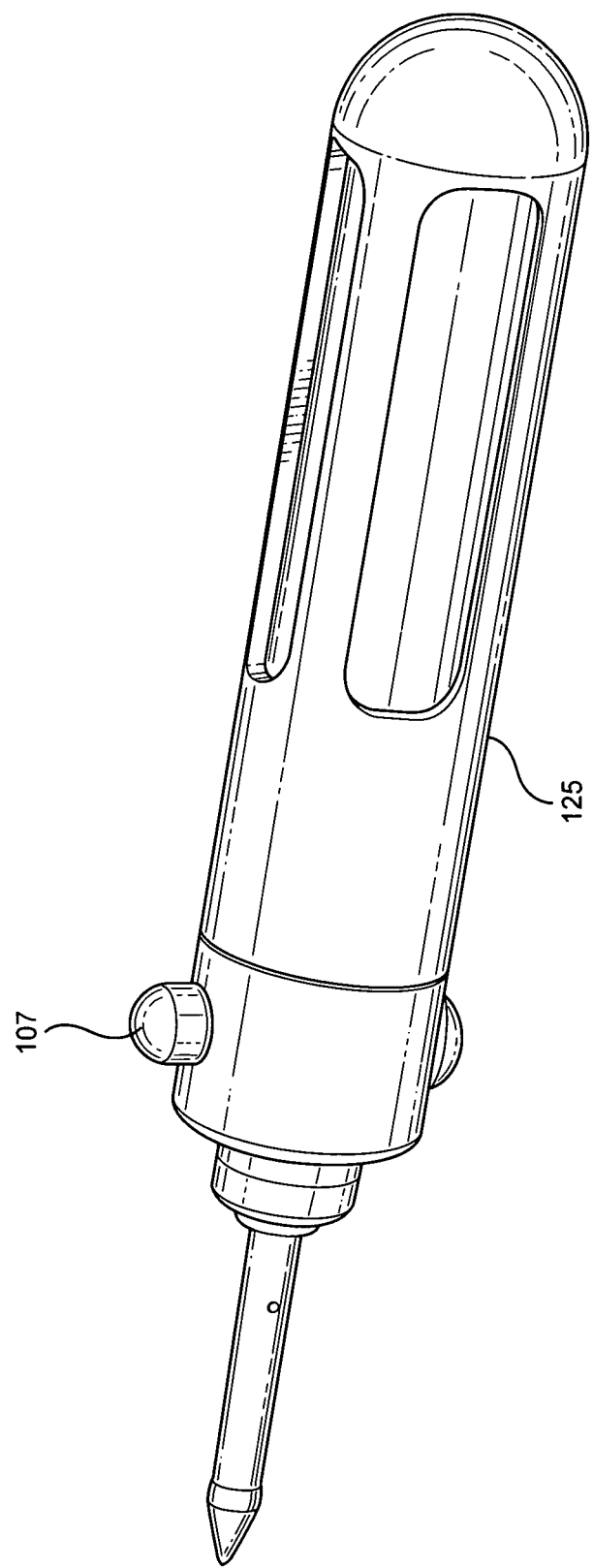
FIG. 39 is a perspective view of an alternative embodiment with a gas flow button switch using a threaded or unthreaded $CO_2$ cartridge.

In another embodiment, a control button 107 (FIGS. 39-41) allows for the control of passage of air from the cartridge 2 through the body 3 and out through the insertion tube 4. In one embodiment the control button 107 is positioned through the body 3 of the repair tool 1. A spring 108 inside of the button apparatus prevents gas flowing into the insertion tube such that the gas from the cylinder will not flow until the control button 107 is pressed. There are two O-rings 109, 110. The first O-ring 109 is positioned in a cutout 111 in the button shaft 112 below the control button 107. The second O-ring 110 is positioned angularly below the first O-ring 109, positioned in a second cut out 113 in the button shaft 112.

Figure 40:
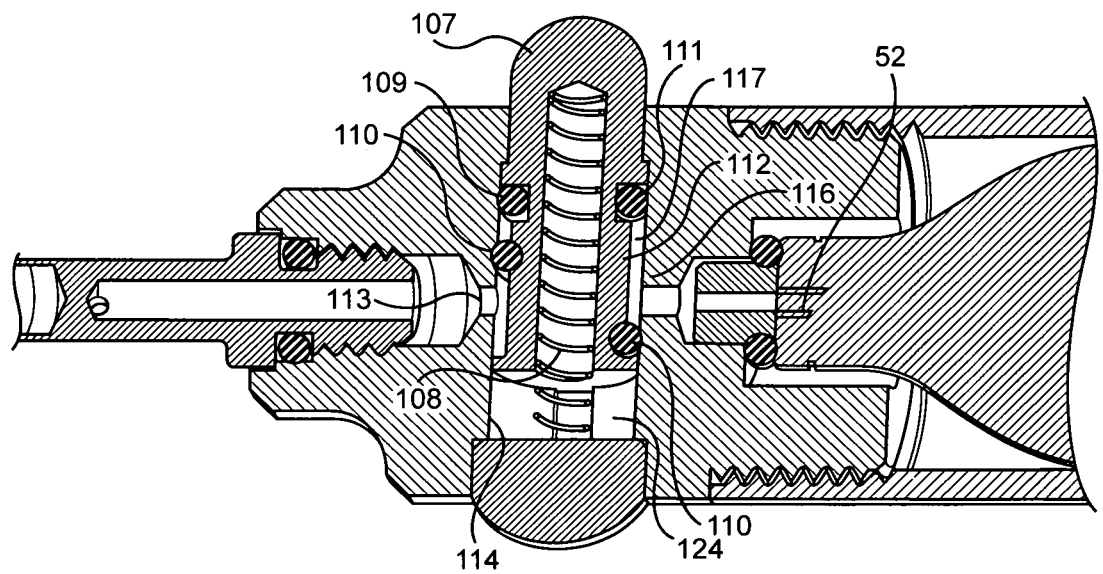
FIG. 40 is a cross sectional view of the repair tool with the gas flow button switch in the closed position.
Figure 41:
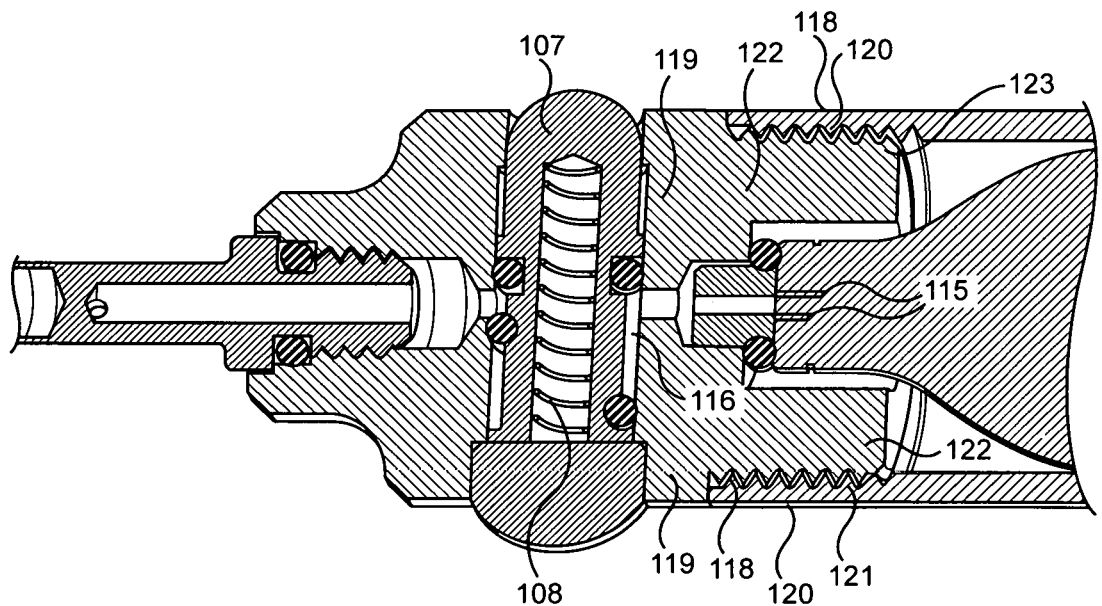
FIG. 41 is a cross sectional view of the repair tool with the gas flow button switch in the open position.

The two O-rings 109, 110 are positioned such that when the control button 107 is in the closed position, the sections of the O-rings 109 are positioned above the air passageway 12 and are positioned against a proximal wall 114 of the control button 107 within the body. In this state, and as shown in FIG. 40, the air or gas from the cylinder passes through the hollow pin 52 or through a double puncture wall 115 through the air passageway in the distal wall of the 116 of the control button such that $CO_2$ gas pressurizes the chamber 117 between the O-rings when the pin 52 punctures the cartridge.

When the button 107 is pressed $CO_2$ gas can flow from the sealed off chamber to the insertion tube 4.

The walls of the extended cartridge sleeve do not terminate at the end of the cartridge 2 but have the extended cartridge sleeve 118. The inside wall 121 of the extended cartridge sleeve 118 are threaded. The walled body 119 has extension walls 122 from its distal end, wherein the outside 123 of the walls are threaded. This allows for the threading of the cartridge sleeve 118 on to the extension walls. Of course, the walled body also has the button control opening 124. The combination of the external canister sleeve 118 and the walled body 119 form a shell or driver housing 125.

Figure 42:
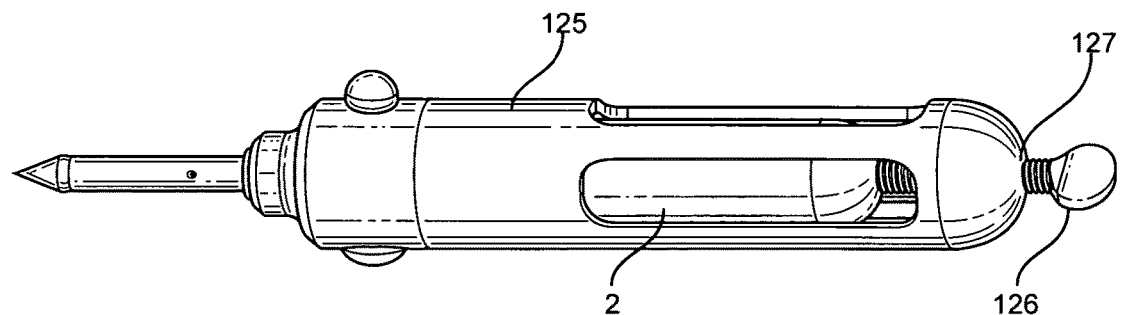
FIG. 42 is a side perspective view of another embodiment of the repair tool having a driver housing with a thumb screw positioned along the X axis of the body for threaded or non-threaded $CO_2$ cartridges.
Figure 43:
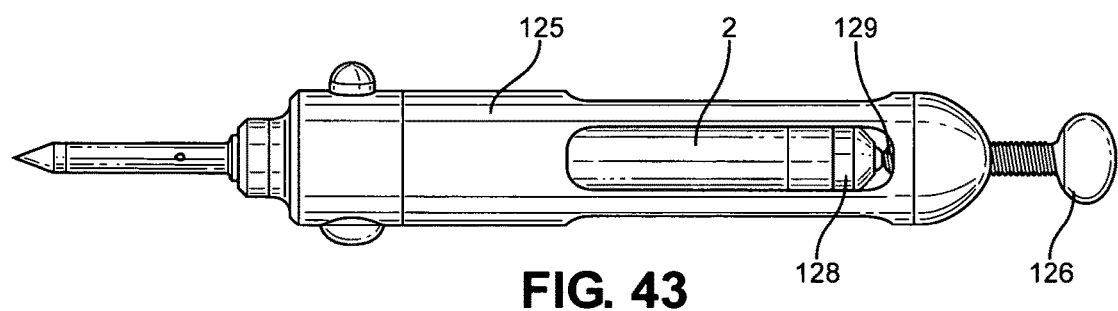
FIG. 43 is a side perspective view of another embodiment of the repair tool having a driver housing with a thumb screw positioned along the X axis of the body for use with threaded or non-threaded $CO_2$ cartridges.
Figure 44:
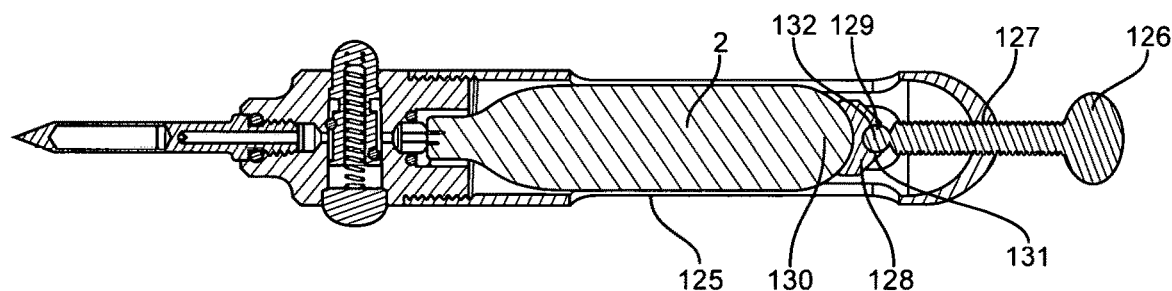
FIG. 44 is a cross sectional view of the embodiment of FIG. 43.
Figure 45:
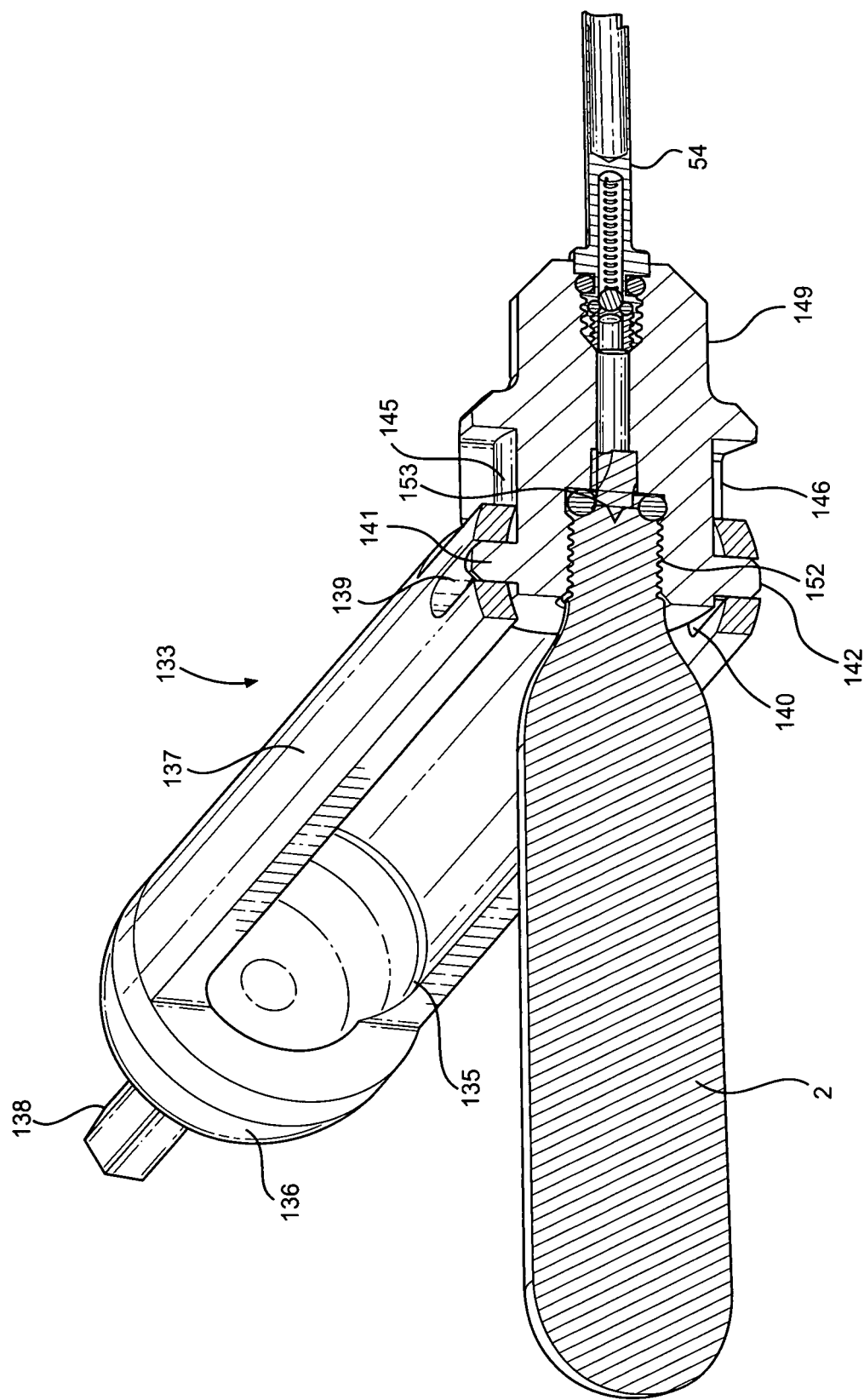
FIG. 45 is a partial cross sectional view of an alternative embodiment of the repair tool.
Figure 46:
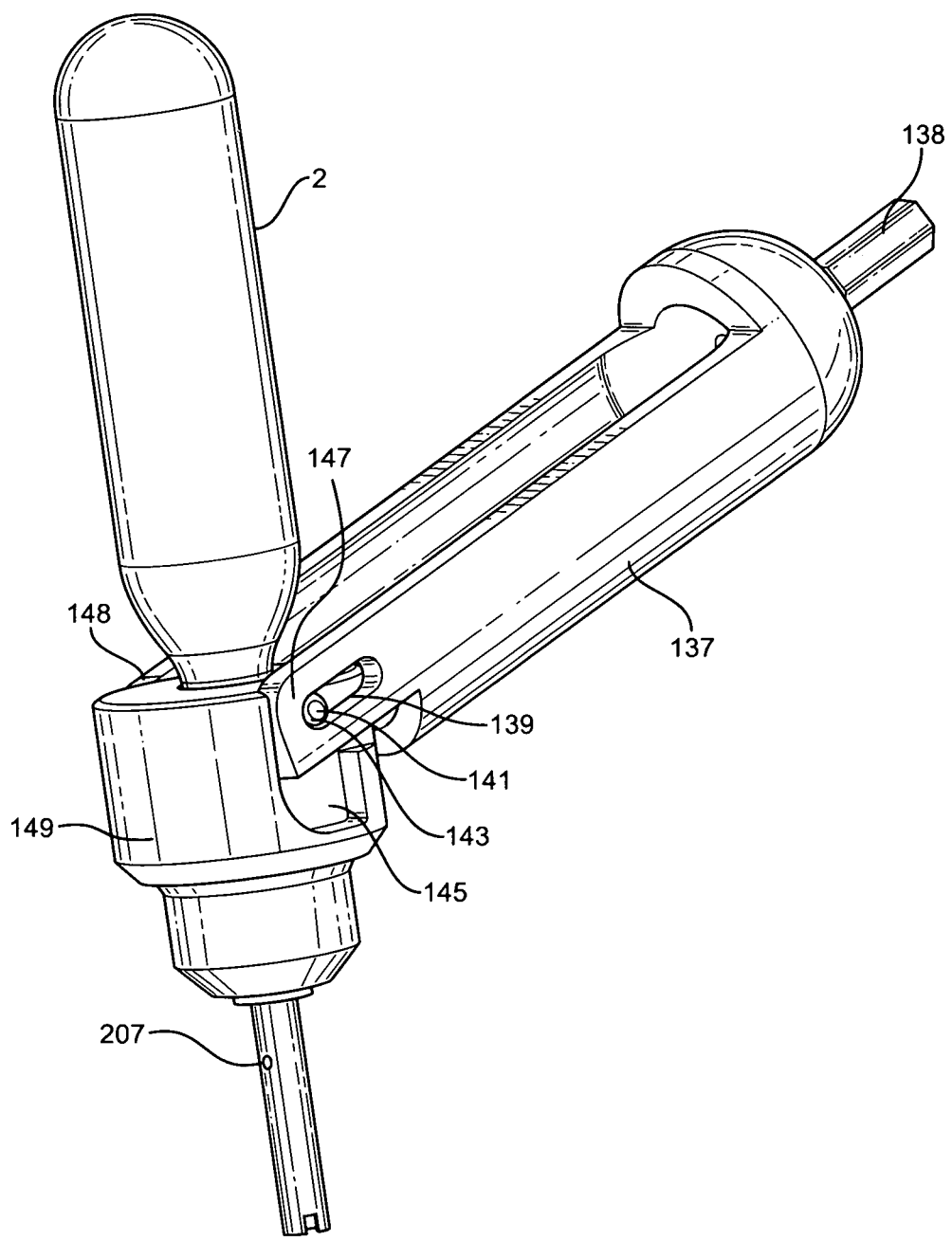
FIG. 46 is a perspective view of the alternative embodiment of the repair tool of FIG. 45.
Figure 47:
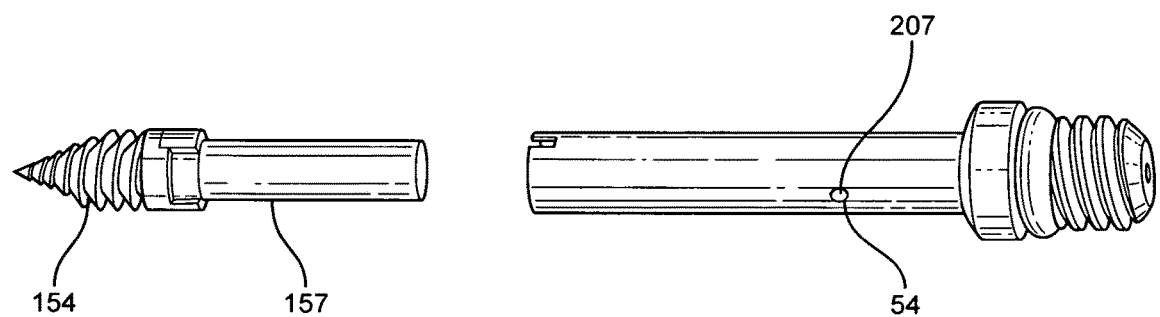
FIG. 47 is a perspective view of the insertion tube with a keyed spiral repair plug.
Figure 48:
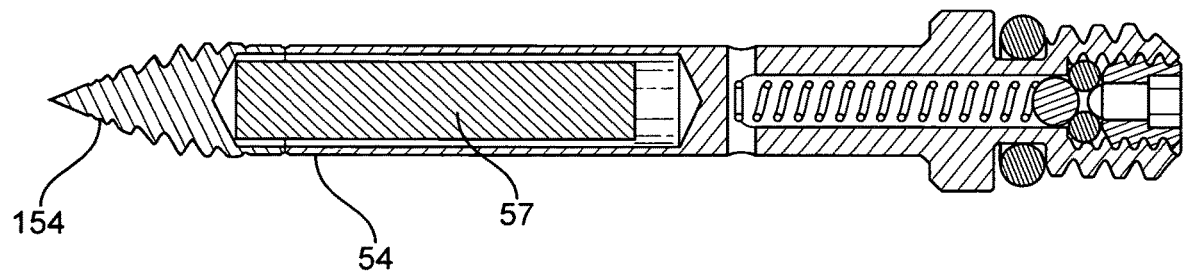
FIG. 48 is a cross-sectional view of the insertion tube with a keyed spiral repair plug and check valve.
Figure 49:
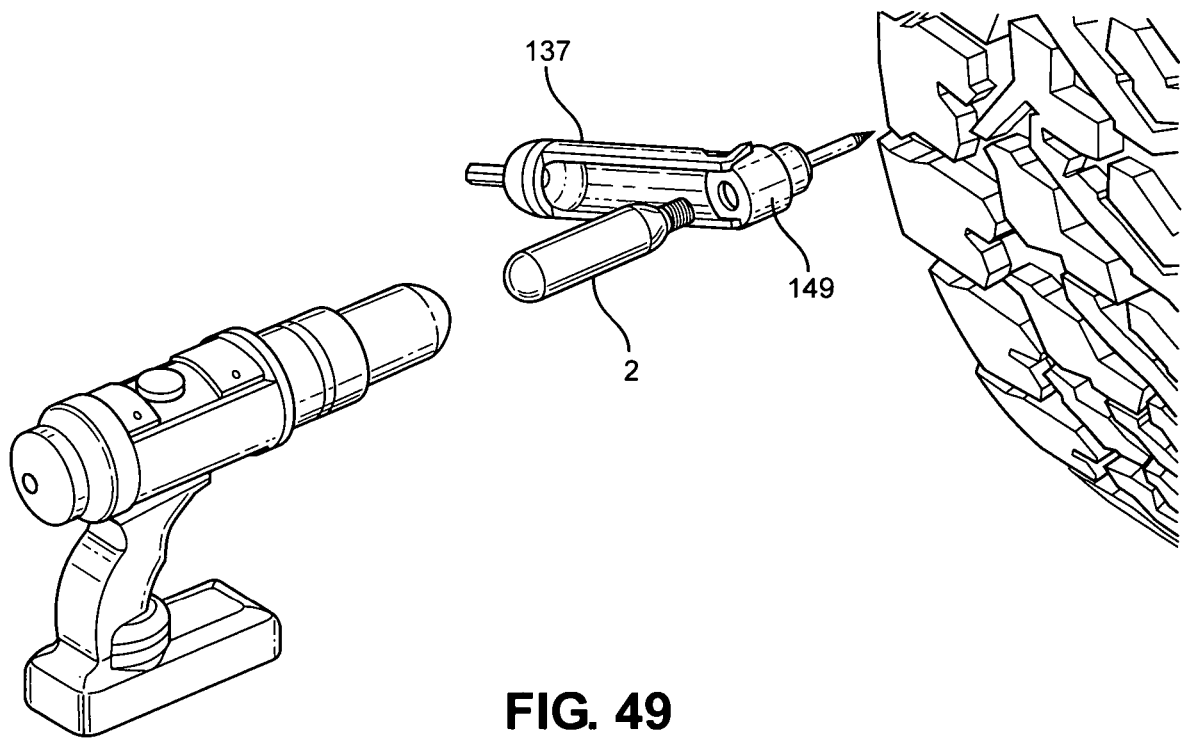
FIG. 49 is a perspective view of the setup to inflate and repair any tubeless tires including an automobile or truck tire using an alternative embodiment of the tool.
Figure 50:
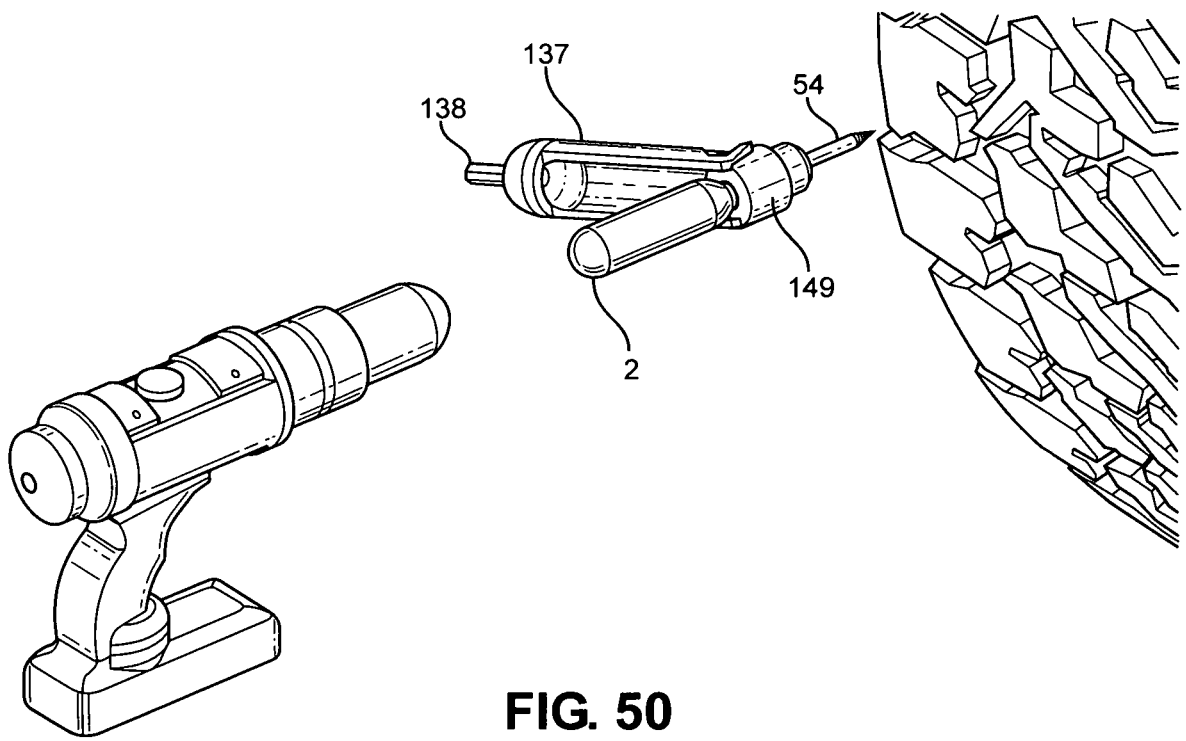
FIG. 50 is a perspective view of the embodiment of FIG. 49, after the cartridge is inserted.
Figure 51:
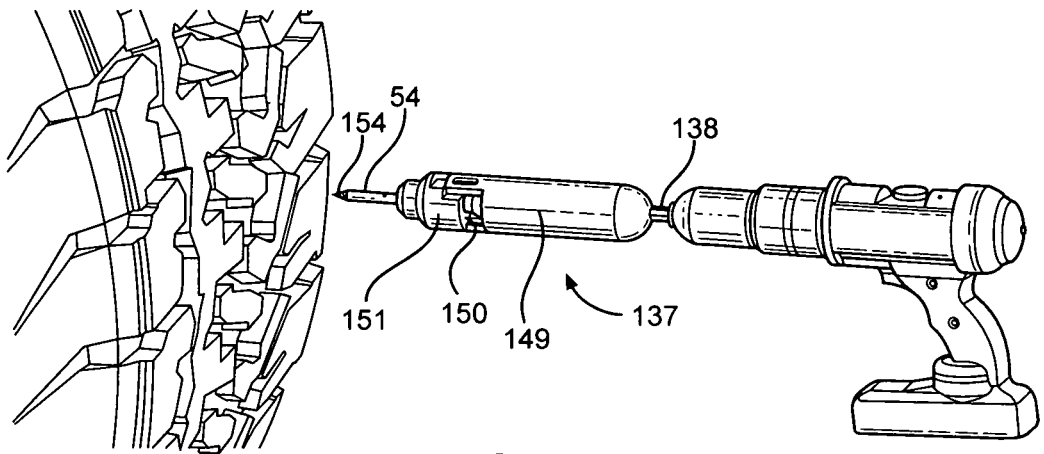
FIG. 51 is a perspective view of the embodiment of FIG. 49, after the tool has been connected to the power drill.
Figure 52:
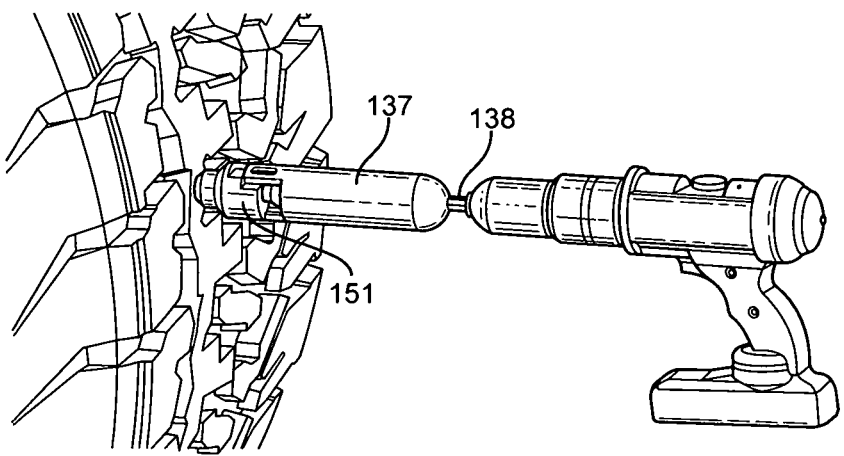
FIG. 52 is a perspective view of the embodiment of FIG. 49 after the insertion tube has been driven into the tubeless tire.
Figure 53:
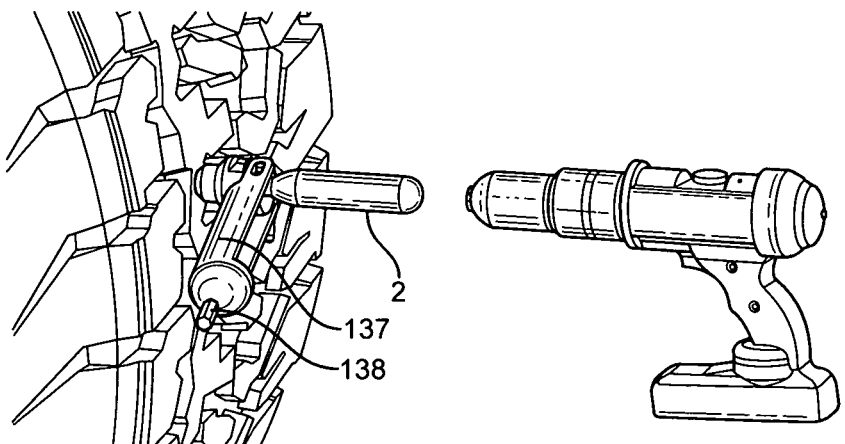
FIG. 53 is a perspective view of the embodiment of FIG. 49, after the drill has been disconnected from the tool to allow for the removal of the cartridge.
Figure 54:
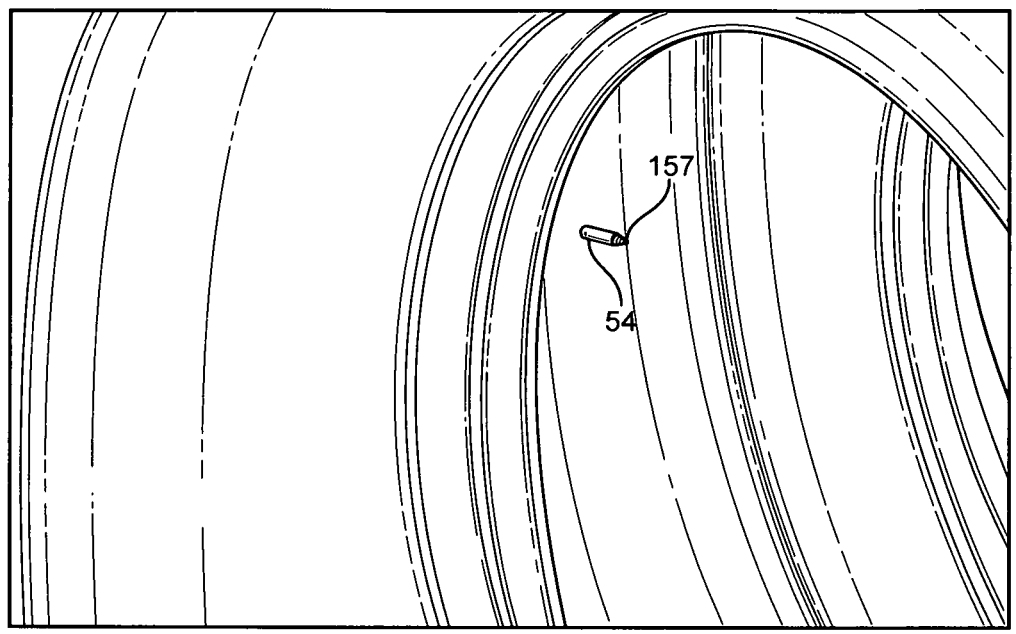
FIG. 54 is a perspective view from the inside of the tire showing the penetration of the insertion tube and spiral tip.
Figure 55:
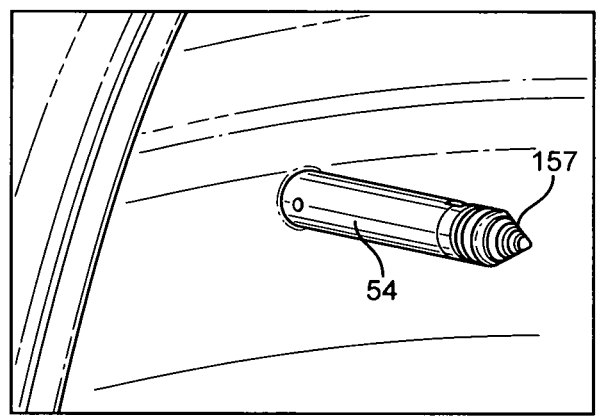
FIG. 55 is a close up perspective view from the inside of the tire showing the penetration of the insertion tube and spiral tip.
Figure 56:
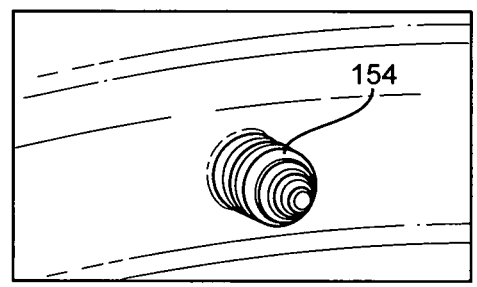
FIG. 56 is a perspective view showing the spiral conical metal tip which remains on the inside of the tire.
Figure 57:
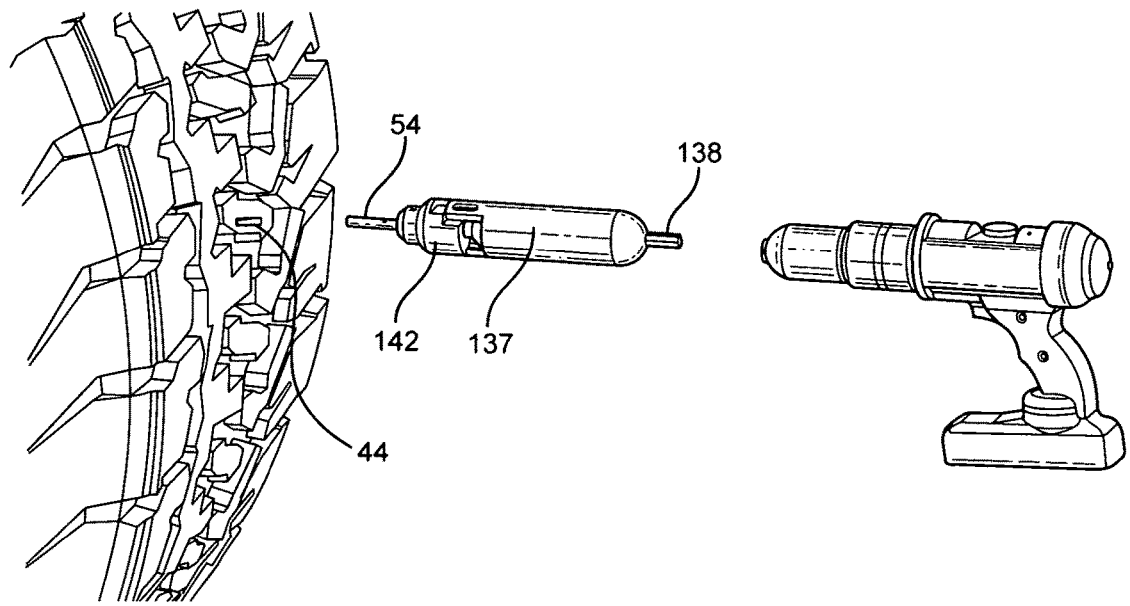
FIG. 57 is a perspective view of the embodiment of FIG. 49, showing disengagement of the embodiment of the tool from the tire.
Figure 58:
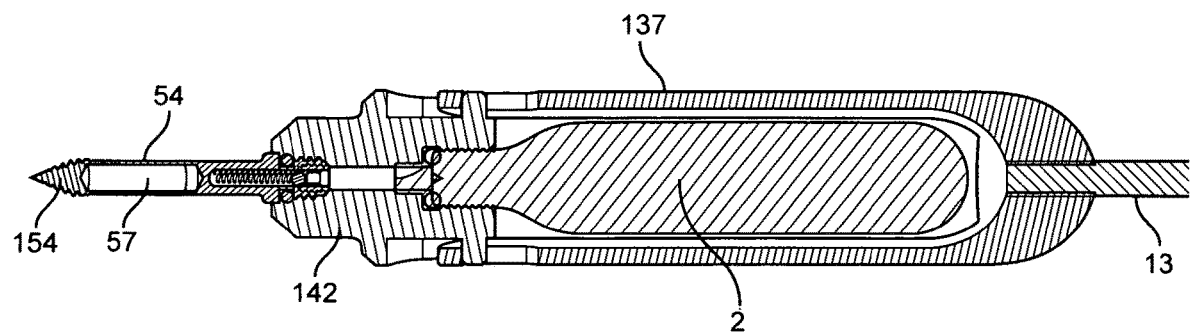
FIG. 58 is a cross section of the embodiment of FIG. 49 with a check valve.
Figure 59:
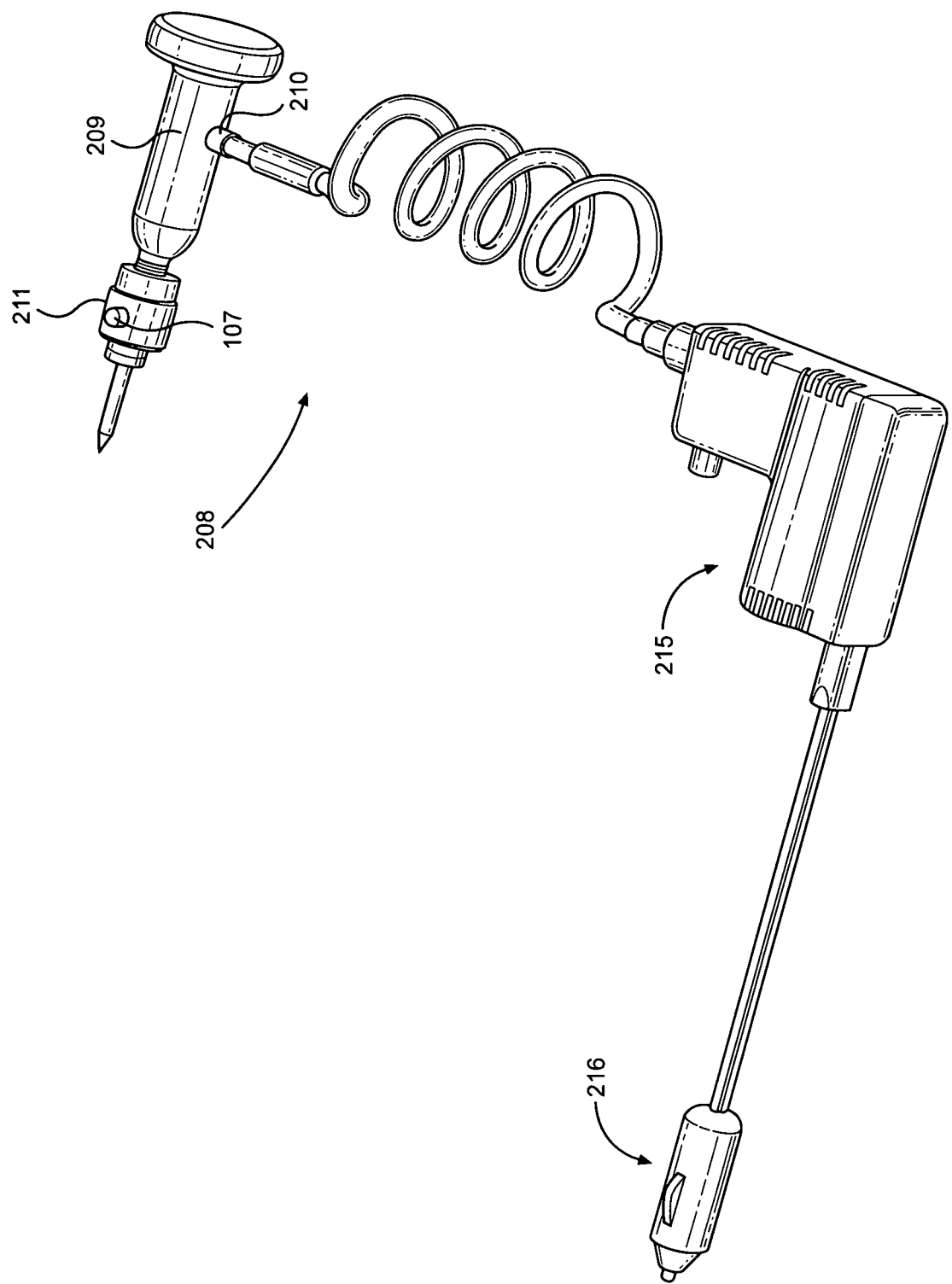
FIG. 59 is a perspective view of a cartridge less tire repair tool using an electric inflator.
Figure 60:
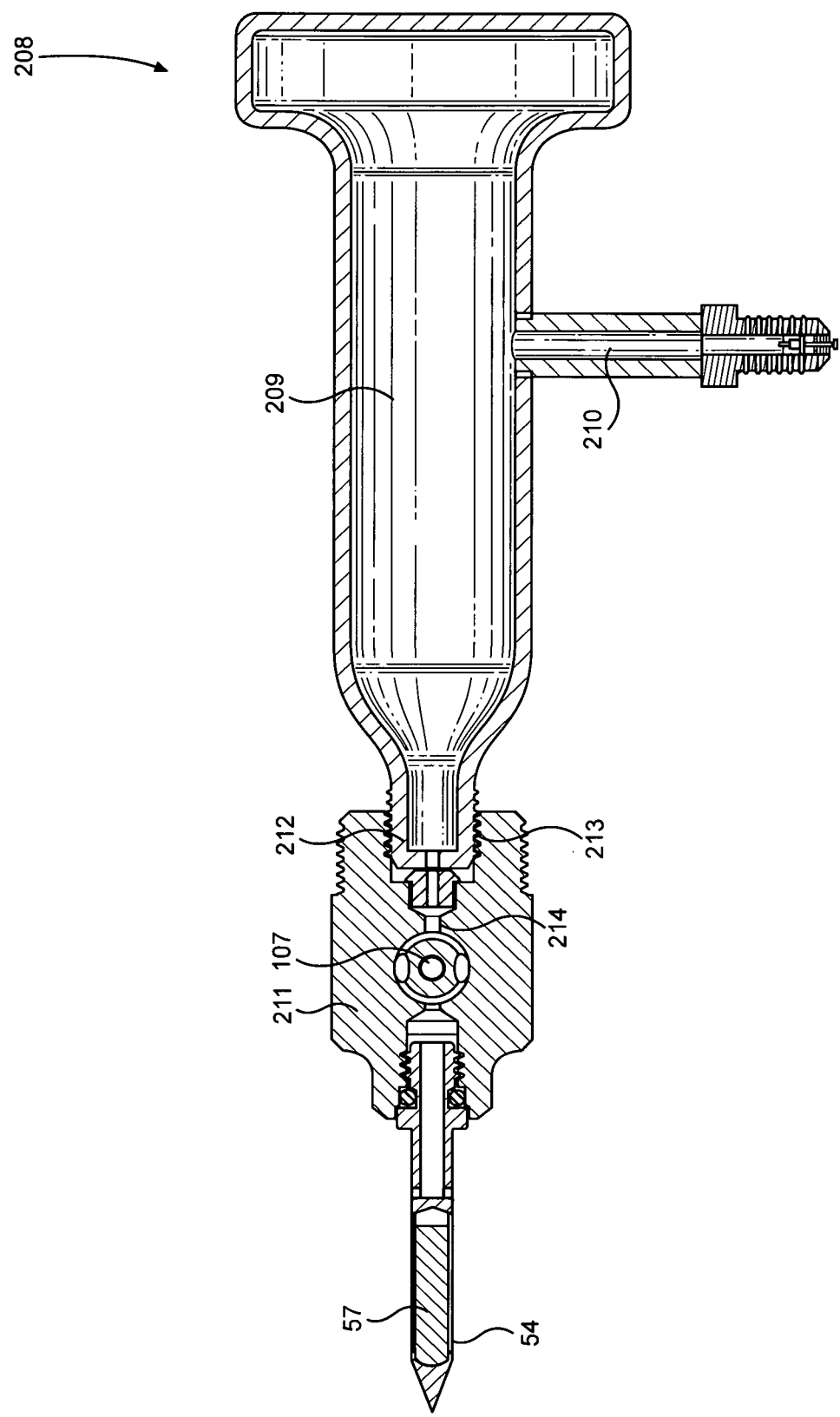
FIG. 60 is a partially cross-sectional view of the cartridge less tire repair tool.

Because not all gas cartridges or cartridges are threaded or are even the same size, a driver housing 125 needs to be adaptable to the various forms and sizes of the cartridges. In one embodiment (FIGS. 42-44), an elongated thumb screw 126 is positioned through a hole 127 in a cap 12 at the distal end of the driver housing 125. In another embodiment, the hole 127 is threaded. As the elongated thumb screw 126 is turned, the cartridge is pushed down towards the body 3 and towards the pin insert which will puncture the seal 11 on the cartridge 2. Because of the length within the driver housing 125, different sized cartridges of $CO_2$ with different amounts of $CO_2$ can be inserted within said driver housing 125. The thumbscrew 126 or equivalent embodiment is used both to secure the cartridge 2 in place and to drive the cartridge 2 forward, towards the pin insert. In one embodiment, there is a molded cap 128 connected to the proximal end 129 of the thumbscrew. The molded cap 128 is concavely contoured to fit the distal end 130 of the canister 2. In one embodiment, the molded cap 128 can be made out of plastic, nylon, metal, wood, or just about any other material. In another embodiment, there is a ¾ round cutout 131 at in the middle of the molded cap 128. At the proximal end of the thumbscrew is a round projection 132 that fits within the cutout 131. This gives the molded cap 128 a degree of freedom of movement, which helps accommodate some differences in the size and shape of the distal end of a cartridge 2.

Some tires or items that need to be inflated are so thick or the material so dense that it is very difficult for the average person to force the insertion tube through the item by hand. FIGS. 45-58 show a device that allows for the tire repair tool 1, and more specifically the insertion tube 4 with a spiral self-boring tip to be power driven into the tire.

Specifically, as shown in the figures, this embodiment of the tire repair kit 133 has a driver housing 137 with a cutaway section 135 wide and long enough into which a cartridge 2 can be fitted. At the distal end 136 of the driver housing 137 is a shank mount 138 to which a power drill can be attached. At the proximal end of the driver housing is a hollowed out groove 139, 140 on each side of the driver housing through which pivot arms 141, 142 extend from each side of the distal end of the body 142. In one embodiment a ringlet 143, 144, rivet, or any other appropriate structure prevents the pivot arms 141, 142 from slipping out of the hollowed out groove 139, 140.

Notches 145, 146 in the body 149 allow for the body to swing and mate with the extended arms 147, 148 of driver housing 137. Specifically, the body 149 is swung into an "open position." A cartridge 2 is fitted into the threads 152 of the body 149, and the seal (not shown) of the cartridge 2 is pierced by cartridge tip piercing component 203. The cartridge is completely rotated until air passage is blocked. A wide insertion tube 54 is positioned at the proximal end of the body 142. At the proximal end of the insertion tube 54, there is a large repair plug 57 connected to a larger spiral conical metal tip 154. The repair plug 57 connected to the spiral conical metal tip 154 may be inserted into the insertion tube 54 and the insertion tube 54 is screwed into the proximal end of the body 149.

The cartridge is swung into position within the body 149, and the body 149 is then swung back into the driver housing 134 such that notches 145, 146 in the body 142 allow for the body to and mate with the extended arms 147, 148 of driver housing 137, further securing the body 142 and driver housing 134 together.

The shank mount 138 is attached to the power drill. The power drill is turned on, and the insertion tube 54 is then drilled into the tire. The driver housing 137 is rotated out of position, and the cartridge 2 is turned counterclockwise slightly to allow air, gases, or liquid/gas combinations from the cartridge 2 to travel through the body 149 and out the insertion tube 54 through hole 207 and into the tire as shown in the figures. The power drill with the insertion tube 54 is withdrawn from the tire, leaving behind the spiral conical metal tip 154 on the inside of the tire, and the repair plug 57 filling in the hole in the tire, preventing further leakage.

It should be noted that the order in which this operation is carried out may be varied.

There are situations where cartridges do not provide enough air to fill up large tires such as truck tires, or where using a multitude of $CO_2$ cartridges is not practical. In those instances, an external source of $CO_2$, gas, or air is needed. In one embodiment, a cartridge less tire repair tool 208 has a hollow air collection shell 209 having a stem 210. The stem may be connected to a hose supplying air to the tire or inflatable. The hollow air collection shell 209 is threadably connected to a body 211 by means of threads 212 on the collection shell 209 complementary to the threads 213 on the body 211. In another embodiment, the body 211, shell 209, and stem 210 are integrally connected, and can be one piece.

The body 211 has no need for an insert pin or any similar structure. It has a flow through air passageway 214 and a control button switch 107 described supra, to control the filling of the tire. In the image shown, the particular stem has a Schrader valve section which is utilized to attach a portable repair inflator/compressor source to inflate tires through the injury. As before, to repair larger tires, the device has an insertion tube 54 with repair plug 57. The device 208 is connected to a portable compressor 215, which is in turn connected to a car charger by means of a charger adapter 216. It should be noted that this is not a limiting feature as the device 208 could be attached to any pump, as well as to any power source. It bears emphasizing that the tool housing is hollow and has the same male threads as other tools having a cartridge 2 as described above. Hence, one can use the body and the insertion tube with a cartridge if desired, if the body 3 has a cartridge piercing tip.

Figure 61:
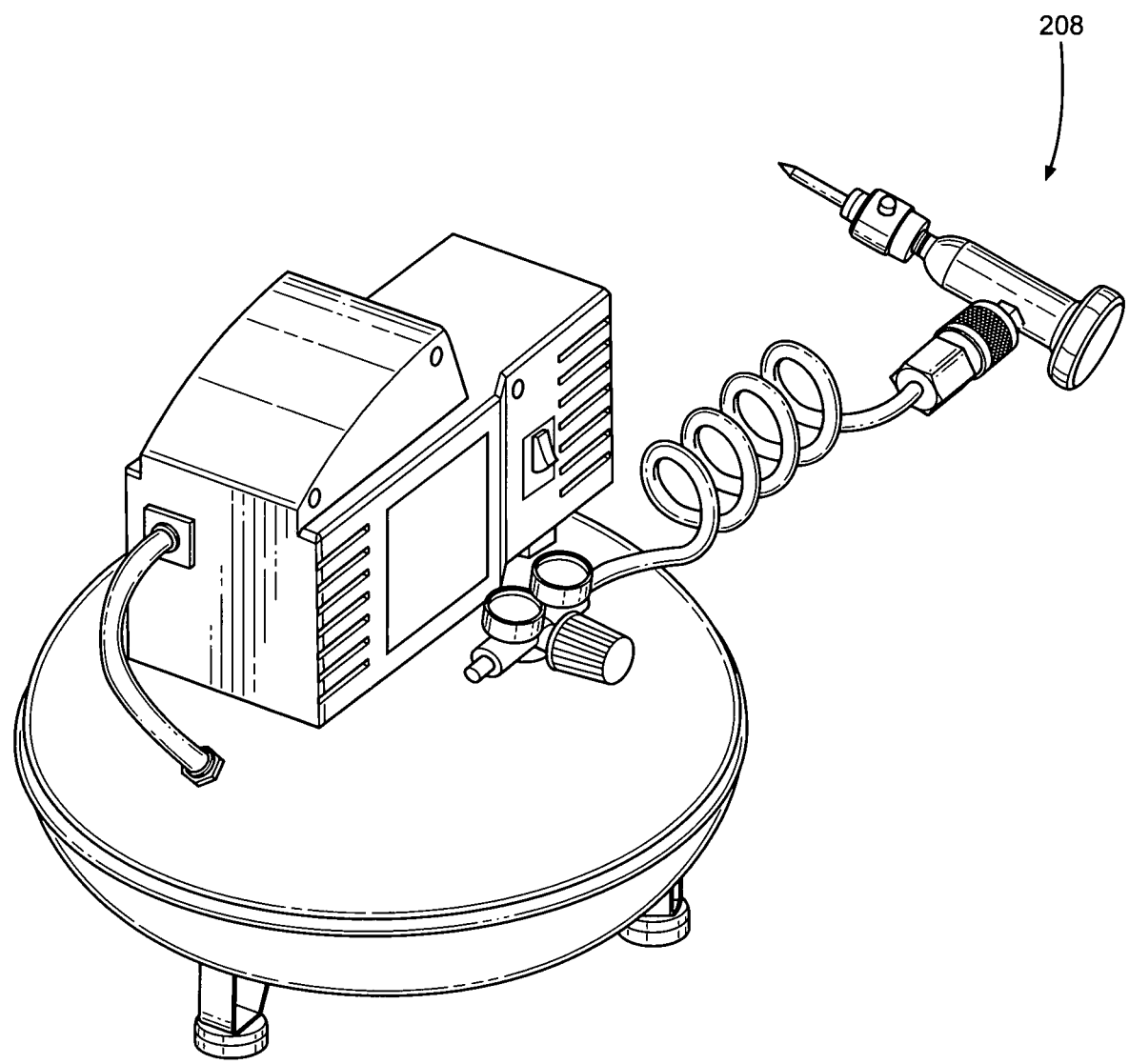
FIG. 61 is a perspective view of another use of the cartridge less tire repair tool using a quick connect female air fitting.

As shown in FIG. 61, the cartridge less repair tool 208 can operate on DC or AC power compressor hooks up its air line via a quick connect or other connector means to inflate the tire with any type of gas, normally air or nitrogen gas. As previously noted, virtually any non-combustible gas can be used. In one embodiment of the disclosure, one of the chief characteristics of this innovation is that the tool housing is hollow and has the same male threads as a threaded $CO_2$ so the embodiment shown above with the push button valve and threaded insertion tube is that same embodiment that can be used with threaded insertion tubes. It should be noted that in one embodiment of the disclosure, a cartridge tip piercing component 203 is fitted within the body 211. Any practical adapter to deliver air from a compressor to the body can be used.

Figures 62, 63A, 63B:
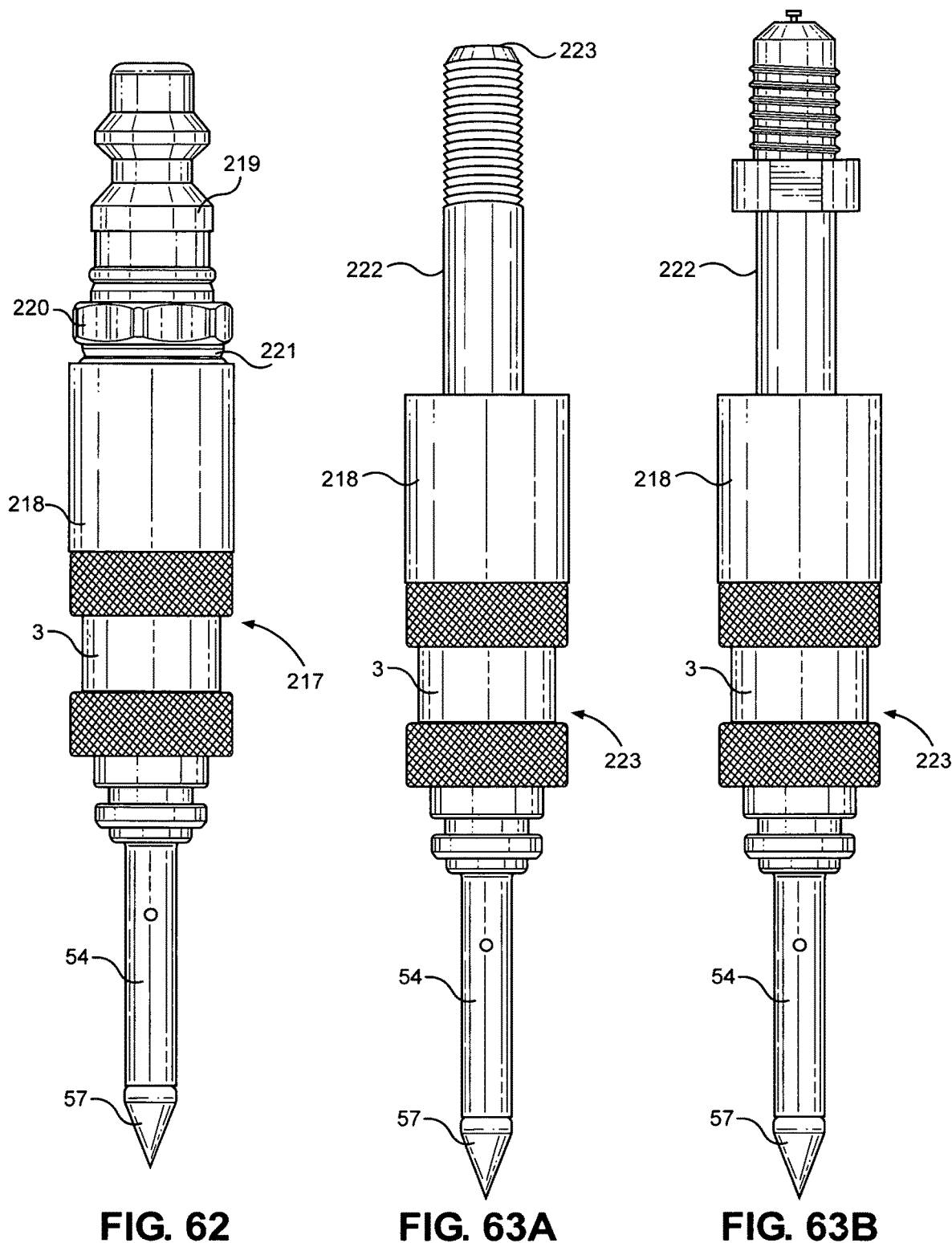
FIG. 62 is a top perspective view of another embodiment of a cartridge less tire repair tool using a male quick connect fitting.
FIG. 63a is a side perspective view of another embodiment of a cartridgeless tire repair tool which is capable of using a Schrader or Presta male valve stem connector.
FIG. 63b is a side perspective view of another embodiment of FIG. 63a showing the use of a Schrader valve stem connector.
Figure 64:
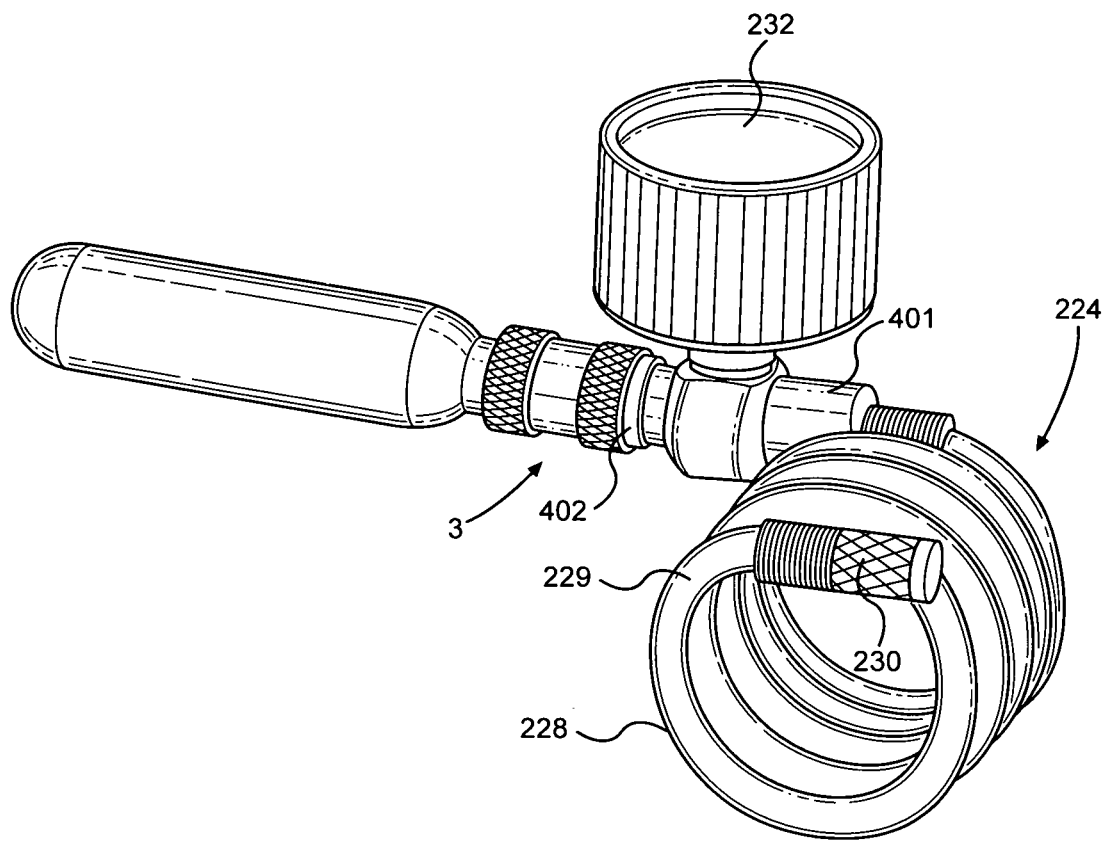
FIG. 64 is a perspective view of the tool having a coiled air hose instead of an insertion tube.
Figure 65:
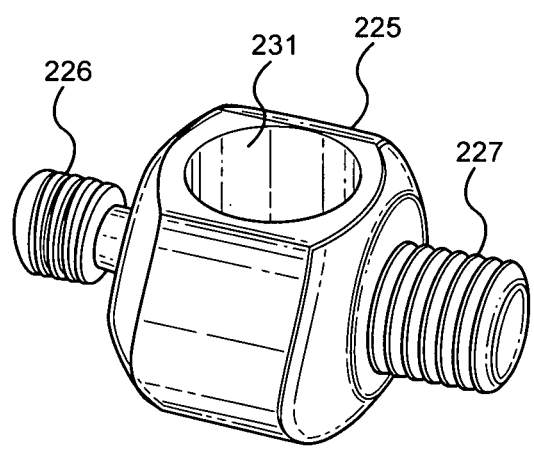
FIG. 65 is a perspective view of an adapter used in FIG. 65.

In another embodiment (FIGS. 62 and 63), the body 3 of the repair tool 217 is attached to another empty housing 218. The housing 218 with a coupler 219 that can be attached to a hose or specialized housing by loosening the threaded nut 220, which in this case is hexagonal. The threaded nut 220 is then moved towards the distal end of the coupler 219. The hose is or other flexible cable is slipped through the nut 220, over the distal end of the coupler 219 and up to the proximal end of the coupler 219. The threaded nut is tightened to the threaded collar 221 of the coupler 219, with the hose or cable between the threaded collar 221 and the threaded nut 220.

The coupler 219 and housing 218 is threaded into a Schraeder male valve stem connector body 222, which is connected to an insertion tube 54 and a repair plug 57. It should be noted that any body 3 that can be fitted with a "large" insertion tube 57 can also be fitted with a regular insertion tube 4 as the size of the threaded mount is the same. Also, in the present device, the empty housing (or air chamber) 218 is threaded onto the body 218 just as a gas cartridge 2 would.

In another embodiment, the coupler is threaded 222, over which an air hose or a Schrader valve can be threaded. In another embodiment, 223 of the coupler is threaded, and an air hose with a male thread can be attached to the coupler. The air hose itself can be used of any appropriate material including but not limited to rubber, plastic, nylon, polyurethane, braided stainless steel, other plastic hose materials and any combination thereof.

Another embodiment attaches a coiled air hose 224 connected to the body 3 by means of an adapter 225. A cartridge 2 is attached to distal end of the body 3. A first threaded arm 226 connected to the first side of the adapter 225 is threaded into the proximal end 402 of the body 3 (Note that in all of the embodiments where there are threads there can be the reverse of which thread is threaded into the other thread). The second threaded arm 227 of the adapter is connected to a coiled hose 228 or other type of hose. The proximal end 229 of the coiled hose 229 is attached to a Schrader or Presta valve stem 230. Other valve stems could be used in other embodiments. In yet another embodiment, the adapter 225 also has a female threaded port 231 large enough to accept a threaded pressure gauge 232. The distal end of the hose has a threaded connection 401 which is threaded over the second threaded arm.

Figure 66:
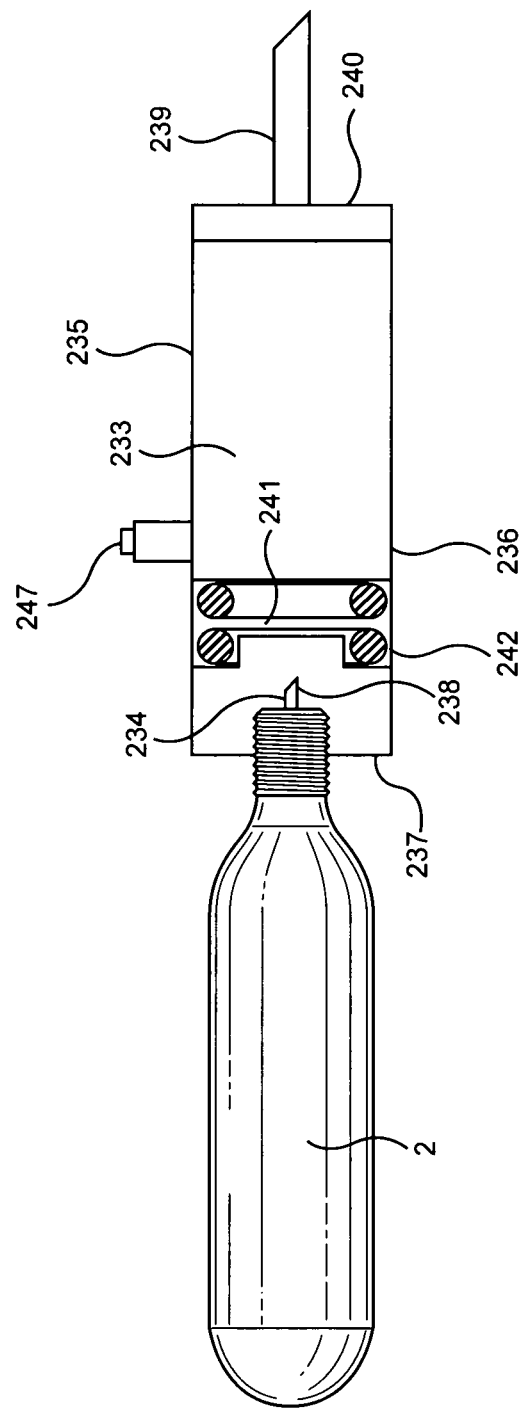
FIG. 66 is cross sectional view of another embodiment of the device for repairing and filling a tire by injecting a sealant.
Figure 67:
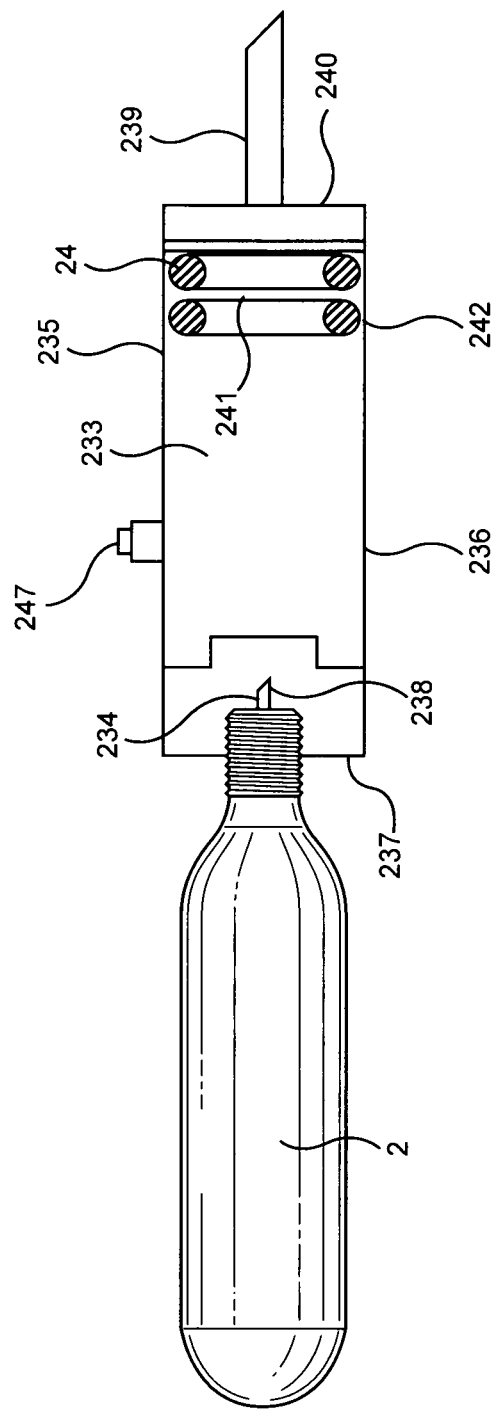
FIG. 67 is a cross sectional view of the embodiment of FIG. 66 after the plunger has been moved to the proximal end of the device.
Figure 68:
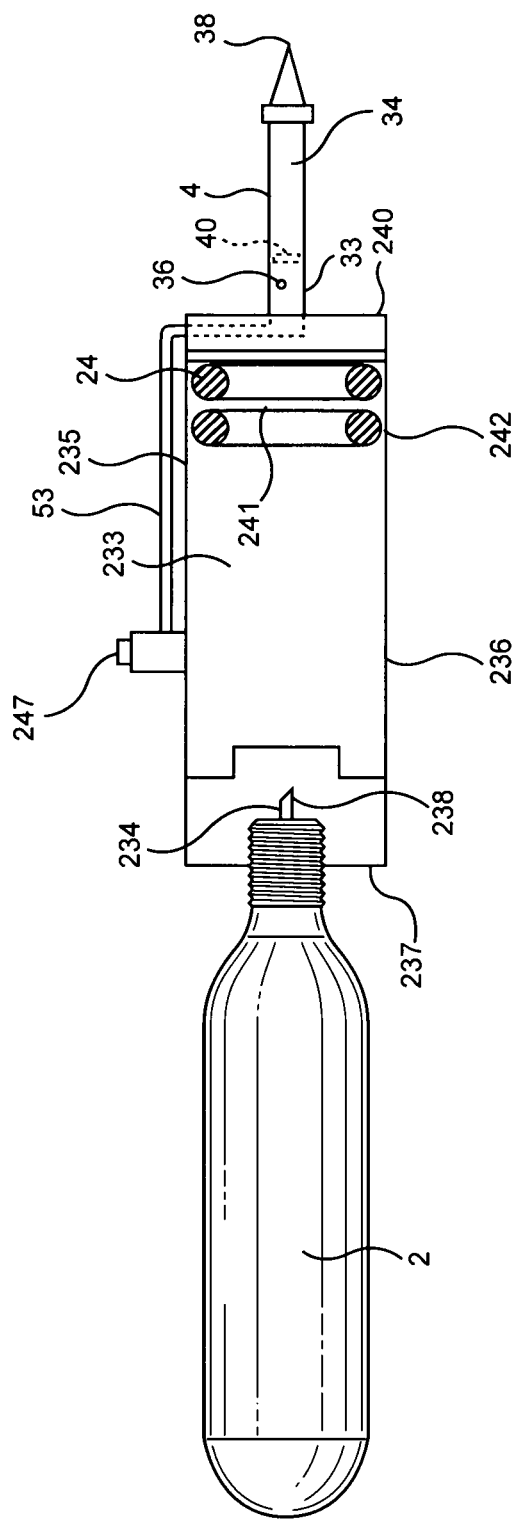
FIG. 68 is a cross sectional view of another embodiment of FIG. 67 which includes an insertion tube with a repair plug for repairing a tire after injecting a sealant.
Figure 69:
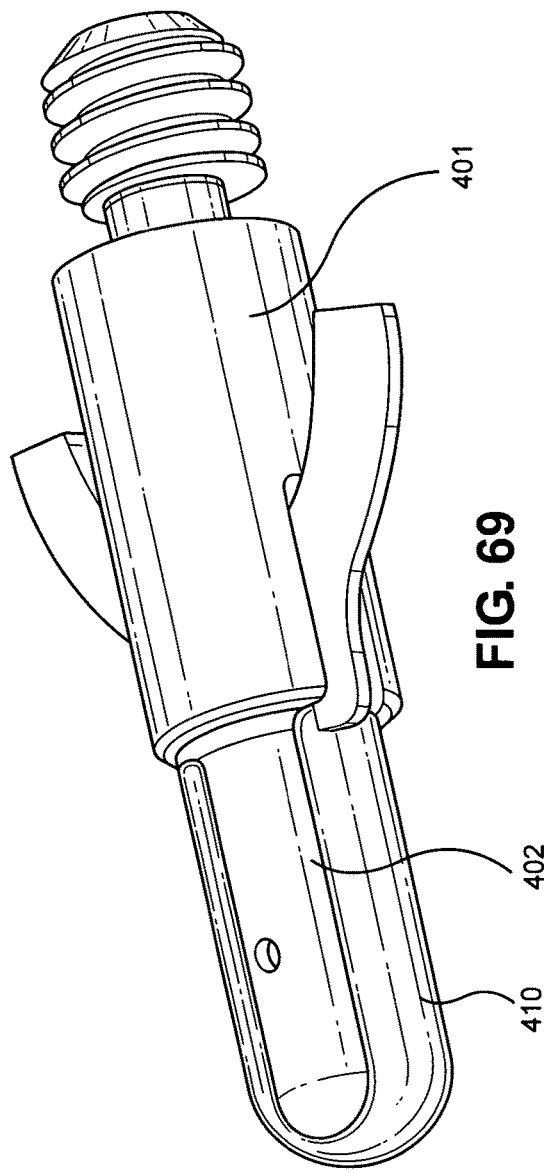
FIG. 69 is a perspective view of for an insertion tube with an adapter, carrying a filler cord.
Figure 70:
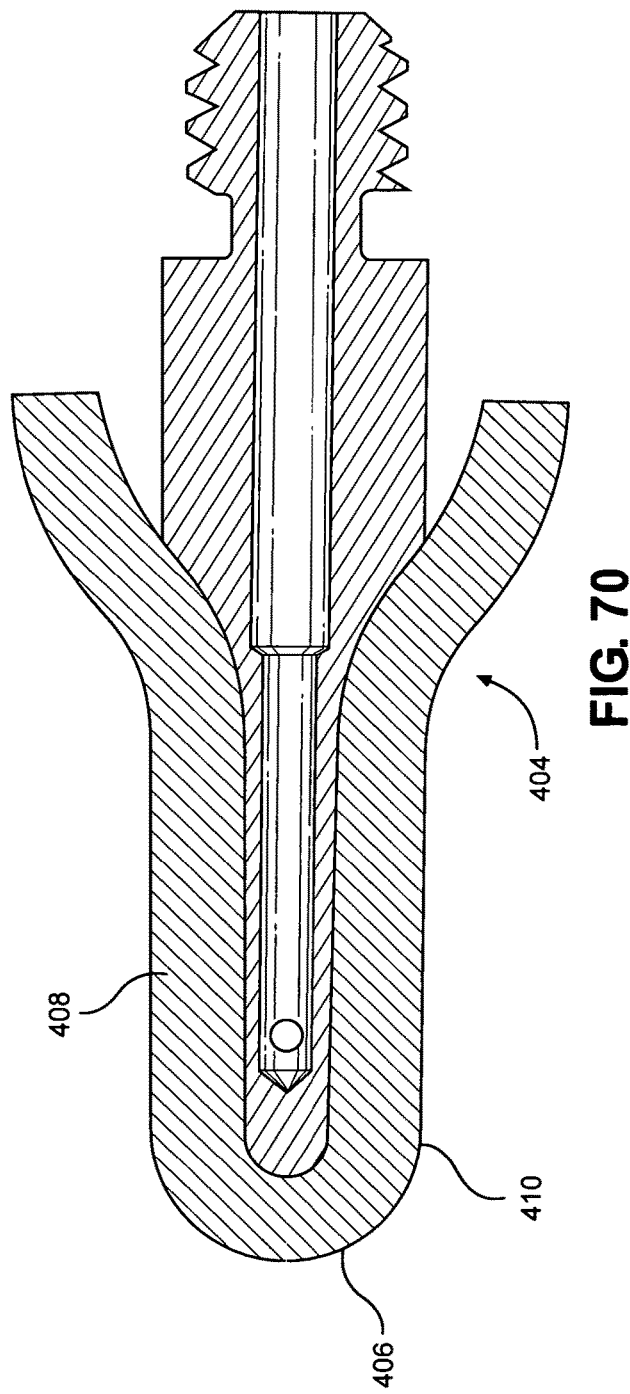
FIG. 70 is a cross-sectional view of the embodiment of FIG. 69.

In another embodiment shown in FIGS. 66-68, a $CO_2$ cartridge 2 is attached to a sealant dispenser 233 for filling and sealing tires. The sealant dispenser 233 has at its distal end female threads 234 to which the cartridge 2 is attached. It has a top wall 235, a bottom wall 236, and a distal wall 237 containing the female threads or other attachment devices, and a tip piercing component 238. At the proximal end is a dispenser needle 239 attached to an end cap 240 that is removable so that the tire sealant can be poured in. Within the sealant dispenser is a movable plunger, 241, which comprises at least one O-ring 242, and in another embodiment a second O-ring 243 for stability and to prevent sealant leakage.

A pressure relief valve 245 allows $CO_2$ gas escape after the plunger pushes the sealant into the tire. It should be noted that other methods of attaching the cartridge to the dispenser may be used, such as locking snap rings. In another embodiment, there is an insertion tube 4 in place of a needle 239. The insertion tube 4 has the upper section 33 comprising at least one hole 36 through which air and sealant passes, and the lower section 34 has an opening through which a repair plug 40 fits. The upper and lower sections are separated by wall 35. There is also a valve tube 246, which, when the pressure relief valve is pressed, air travels from the release valve 247, through the valve tube 246 and into the upper section of the insertion tube and out through the at least one hole 36.

To operate, the sealant dispenser 233 is filled with the sealant, and the removable end cap 240 is fitted back on the proximal end of the sealant dispenser 233. The $CO_2$ cartridge is attached, the $CO_2$ seal is punctured and the plunger 241 moves forward, dispensing the sealant through the dispenser needle 239 or through the insertion tube 4 and out through the at least one hole 36. The release of the sealant should be at a reasonably fast but controlled rate of speed. As with other descriptions supra, elements may be added to this device. Indeed, all elements in the description, can, where practical, be used with other elements of the disclosure. As shown in FIG. 67, the O-ring plunger is near the proximal end of the chamber after the sealant has been injected into the tire.

When an insertion tube 4 is used the release valve 247 is pressed and air travels through the valve tube 246 which allows both the hole 36 to be blown clean and allows the tire to be filled to the desired pressure. The release valve 247 is closed by removing one's finger from the valve 239. The insertion tube is then withdrawn, leaving behind the plug 40 to complete the seal and repair of the tire.

It should also be noted that the flow switch button 107, a pressure gauge 62 with a digital readout 63, reverse blocking valve formed by a check valve compression spring 46, the ball valve lever 61 and the other features mentioned, supra, can be used alone or in combination with the other features in all of the embodiments, in this disclosure.

In another embodiment, a bullet nosed cylindrical insertion tube 400 has a distal cylindrical section 401 and a bullet nosed proximal section 402. The proximal section has an air hole or passageway 403. In one embodiment, The bullet nosed cylindrical insertion tube 400 is bored out up to the air hole 403. A continuous indenture or groove 405 into which is fitted a repair cord 410 wraps around from one side of the distal section 401, up and around the proximal end 406, and continues down the other side 408 in a mirror image. Like any insertion tube, the distal end of the insertion tube is threaded into the proximal end of the body 3 of the tire repair kit. More specifically, with this embodiment, a repair cord can be added in the insertion tube indentures which can then be inserted into the tire. As with other embodiments described above, there is an internal passageway for the gas, air, $CO_2$, or gas/liquid combinations to be propelled by a $CO_2$ type canister using an assembly similar to FIG. 1. Once the insertion tube is fitted into the tear in the tire and the air, $CO_2$, gas or gas/liquid combination is released into the tire injury, via the air hole 403, the tool can be withdrawn, leaving the repair cord in the tire, thereby filling the tire tear or injury and preventing air loss. This method of insertion allows a cord only repair which does not require reaming of the tire with a repair tip.

In alternative embodiments, the distal end of this insertion tube can have a variety of geometric shapes, and does not have to be cylindrical.

It will be apparent to those skilled in the art that various modifications and variations can be made to the disclosure described above without departing from the spirit or scope of the disclosure. Thus, it is intended that the present disclosure cover modifications and variations that come within the scope of the appended claims and their equivalents.

The invention claimed is:
1. A tire repair tool comprising:
 a) a transmittal control section capable of transmitting a material form selected from the group consisting of a gas, air, liquid, and any combination thereof, said transmittal control section comprising:
  1) a proximal end, said proximal end having an opening;

2) a distal end, said distal end having a centralized opening to connectively mate with a proximal end of a gas cartridge, said gas cartridge filled with a material selected from the group consisting of air, gas, and liquid/gas combinations, and having a puncturable seal at its proximal end;

3) an air passage way positioned between said proximal end of said gas cartridge and said proximal end of said transmittal control section;

4) a puncture tool which can puncture the puncturable seal of the gas cartridge, said puncture tool positioned at the distal end of said transmittal control section along the air passage way;

b) an elongated insertion tube for insertion into a break or hole in a tire, said insertion tube comprising:

1) an air inlet at a distal end of said tube, said distal end of said tube being integral with or connected to said opening of said proximal end of said transmittal control section; and 2) a gas outlet, for passing air, gas, or a gas/liquid from a gas cartridge through said gas passage way through the transmittal control section into the inlet of the tube, and through the gas outlet, the gas outlet positioned on an upper end of said insertion tube;

3) a repair plug opening positioned at the proximal end of the insertion tube; and 4) an air impermeable wall, said impermeable wall separating said upper end of said gas outlet and said repair plug opening positioned at the proximal end of said insertion tube.

2. The tire repair tool of claim 1, wherein:
a) said gas cartridge is threaded at said proximal end; and
b) said transmittal control section is threaded at its distal end, such that said gas cartridge and said transmittal control section threadably mate.

3. The tire repair tool of claim 1, wherein said puncture tool further comprises:
a) a shape selected from the group consisting of a cylinder and a polygon; and
b) a groove in a side of the puncture tool to allow air to pass from the gas cartridge, thereby allowing air from said gas cartridge to traverse through said transmittal control section, and out through said gas outlet of said insertion tube.

4. The tire repair tool of claim 1, further comprising a tire repair plug positioned in said tire repair plug opening of said insertion tube.

5. The tire repair tool of claim 1, wherein the transmittal control section further comprising a circumference around an X axis, said circumference selected from the group consisting of round and polygonal.

6. The tire repair tool of claim 5, wherein said transmittal control section further comprises at least one knurl around the X axis.

7. The tire repair tool of claim 1, wherein:
a) said proximal end of said transmittal control section is threaded around an inside of said proximal end of said transmittal control section; and
b) said distal end of said insertion tube is threaded around an outside of said insertion tube;
such that said proximal end of said transmittal control section and said distal end of said insertion tube are threadably mated.

8. The tire repair tool of claim 1, further comprising a reverse blocking valve.

9. The tire repair tool of claim 1, further comprising a tire pressure gauge positioned between the insertion tube and the transmittal control section.

10. The tire repair tool of claim 1, further comprising a plugger, said plugger comprising:
a) a distal end, said distal end connected to said proximal end of said insertion tube; and
c) a tong assembly positioned at the proximal end of said plugger, said tong assembly used to position a repair cord into a puncture hole in a tire.

11. The tire repair tool of claim 1, further comprising a control valve positioned in the transmittal control section, said control valve allowing for the control of passage of air from the cartridge through the transmittal control section and out through the insertion tube.

12. The tire repair tool of claim 11, wherein said control valve is positioned at the distal end of the transmittal control section.

13. The tire repair tool of claim 1, further comprising a driver housing; said driver housing comprising:
a) an elongated body that fits over the gas cartridge;
b) a proximal end;
c) a distal end;
d) an inside rim at the proximal end of the elongated body that mates with an outside distal rim of the transmittal control section;
e) a threaded opening in the distal end of the elongated body;
f) an elongated thumb screw that fits through the threaded opening; and
g) a cap which fits over a rounded end of the proximal end of the gas cartridge.

14. The tire repair tool of claim 1, wherein said insertion tube is in the form of a plugger, said plugger comprising:
a tong assembly positioned at the proximal end of said plugger, said tong assembly used to position a repair cord into a puncture hole in a tire.

15. The tire repair tool of claim 1, further comprising:
a) threading within the proximal end of the insertion tube; and
b) a plugger, said plugger having a distal end and a proximal end, said distal end of said plugger having threading to thread with said proximal end of the insertion tube.

16. A tire repair tool, comprising:
a) a transmittal control section capable of transmitting a material form selected from the group consisting of a gas, air, liquid, and any combination thereof, said transmittal control section comprising:
1) a proximal end, said proximal end having an opening;
2) a distal end, said distal end having a centralized opening to connectively mate with a proximal end of a gas cartridge, said gas cartridge filled with a material selected from the group consisting of air, gas, liquid, and combinations thereof, and having a puncturable seal at its proximal end;
3) an air passage way positioned between said proximal end of said gas cartridge and said proximal end of said transmittal control section;
4) a puncture tool which can puncture the puncturable seal of the gas cartridge, said puncture tool positioned at the distal end of said transmittal control section along the air passage way;
b) an elongated insertion tube plugger combination for insertion into a break or hole in a tire, said insertion tube plugger combination comprising:

1) an insertion tube section, comprising:
   A) an air inlet at a distal end, said distal end of said insertion tube section being integral with or connected to said opening of said proximal end of said transmittal control section; and
   B) a gas outlet, for passing air, gas, or a gas/liquid from a gas cartridge through said gas passage way through the transmittal control section into the inlet of the tube, and through the gas outlet; and
2) a plugger section positioned at the proximal end of the insertion tube, said plugger section having the ability for containment of cord or other flexible filler material.

17. The tire repair tool of claim 16, wherein:
   c) said gas cartridge is threaded at said proximal end; and
   d) said transmittal control section is threaded at its distal end, such that said gas cartridge and said transmittal control section threadably mate.

18. The tire repair tool of claim 16, wherein said puncture tool further comprises:
   b) a shape selected from the group consisting of a cylinder and a polygon; and
   c) a groove in a side of the puncture tool to allow air to pass from the gas cartridge, thereby allowing air from said gas cartridge to traverse through said transmittal control section, and out through said gas outlet of said insertion tube.

19. The tire repair tool of claim 16, wherein the transmittal control section further comprising a circumference around an X axis, said circumference selected from the group consisting of round and polygonal.

20. The tire repair tool of claim 19, wherein said transmittal control section further comprises at least one knurl around the X axis.

21. The tire repair tool of claim 16, wherein:
   a) said proximal end of said transmittal control section is threaded around an inside of said proximal end of said transmittal control section; and
   b) said distal end of said insertion tube is threaded around an outside of said insertion tube;
wherein said proximal end of said transmittal control section and said distal end of said insertion tube are threadably mated.

22. The tire repair tool of claim 16, further comprising a reverse blocking valve positioned within said upper end of said insertion tube.

23. The tire repair tool of claim 16, further comprising a tire pressure gauge positioned between the insertion tube and the transmittal control section.

24. The tire repair tool of claim 16, further comprising a plugger which is positioned in or at said plugger section, said plugger comprising:
   a) a distal end, said distal end connected to said proximal end of said insertion tube; and
   c) a tong assembly positioned at the proximal end of said plugger, said tong assembly used to position a repair cord into a puncture hole in a tire.

25. The tire repair tool of claim 24, wherein said plugger is integral with said insertion tube.

26. The tire repair tool of claim 25, further comprising a control valve positioned in the transmittal control section, said control valve allowing for the control of passage of air from the cartridge through the transmittal control section and out through the insertion tube.

27. The repair tool of claim 26, wherein said control valve is positioned at the distal end of the transmittal control section.

28. The tire repair tool of claim 16, further comprising a driver housing; said driver housing comprising:
   a) an elongated body that fits over the gas cartridge;
   b) a proximal end;
   c) a distal end;
   d) an inside rim at the proximal end of the elongated body that mates with an outside distal rim of the transmittal control section;
   e) a threaded opening in the distal end of the elongated body;
   f) an elongated thumb screw that fits through the threaded opening; and
   g) a cap which fits over a rounded end of the proximal end of the gas cartridge.

29. The tire repair tool of claim 16, wherein said insertion tube is in the form of a plugger, said plugger comprising:
   a tong assembly positioned at the proximal end of said plugger, said tong assembly used to position a repair cord into a puncture hole in a tire.

30. The tire repair tool of claim 16, further comprising:
   a) threading within the proximal end of the insertion tube; and
   b) a plugger, said plugger having a distal end and a proximal end, said distal end of said plugger having threading to thread with said proximal end of the insertion tube.

31. A tire repair tool comprising:
   a) a transmittal control section capable of transmitting a material form selected from the group consisting of a gas, air, liquid, and any combination thereof, said transmittal control section comprising:
      1) a proximal end, said proximal end having an opening;
      2) a distal end, said distal end having a centralized opening to connectively mate with a a proximal end of a gas cartridge, said gas cartridge filled with a material selected from the group consisting of air, gas, and liquid/gas combinations, and having a puncturable seal at its proximal end;
      3) an air passage way positioned between said proximal end of said gas cartridge and said proximal end of said transmittal control section;
      4) a puncture tool which can puncture the puncturable seal of the gas cartridge, said puncture tool positioned at the distal end of said transmittal control section along the air passage way;
   b) a non-valved elongated insertion tube, said elongated tube having a length long enough for insertion into an interior of a tire through a break or hole, said insertion tube comprising:
      1) an air inlet at a distal end of said tube, said distal end of said tube being integral with or connected to said opening of said proximal end of said transmittal control section; and
      2) a gas outlet, for passing air, gas, or a gas/liquid from a gas cartridge through said gas passage way through the transmittal control section into the inlet of the tube, and through the gas outlet; and
      3) an opening positioned at the proximal end of the insertion tube.

32. The tire repair tool of claim 31, wherein:
   a) said gas cartridge is threaded at said proximal end; and
   b) said transmittal control section is threaded at its distal end, such that said gas cartridge and said transmittal control section threadably mate.

33. The tire repair tool of claim 31, wherein said puncture tool further comprises:

a) a shape selected from the group consisting of a cylinder and a polygon; and
b) a groove in a side of the puncture tool to allow air to pass from the gas cartridge, thereby allowing air from said gas cartridge to traverse through said transmittal control section, and out through said gas outlet of said insertion tube.

34. The tire repair tool of claim 31, further comprising a tire repair plug positioned in said tire repair plug opening of said insertion tube.

35. The tire repair tool of claim 31, wherein the transmittal control section further comprising a circumference around an X axis, said circumference selected from the group consisting of round and polygonal.

36. The tire repair tool of claim 31, wherein said transmittal control section further comprises at least one knurl around an X axis.

37. The tire repair tool of claim 31, wherein:
a) said proximal end of said transmittal control section is threaded around an inside of said proximal end of said transmittal control section; and
b) said distal end of said insertion tube is threaded around an outside of said insertion tube;
such that said proximal end of said transmittal control section and said distal end of said insertion tube are threadably mated.

38. The tire repair tool of claim 31, further comprising a reverse blocking valve.

39. The tire repair tool of claim 31, further comprising a tire pressure gauge positioned between the insertion tube and the transmittal control section.

40. The tire repair tool of claim 31, further comprising a plugger, said is in the form of a plugger, said plugger comprising:
a) a distal end, said distal end connected to said proximal end of said insertion tube; and
c) a tong assembly positioned at the proximal end of said plugger, said tong assembly used to position a repair cord into a puncture hole in a tire.

41. The tire repair tool of claim 31, further comprising a control valve positioned in the transmittal control section, said control valve allowing for the control of passage of air from the cartridge through the transmittal control section and out through the insertion tube.

42. The tire repair tool of claim 41, wherein said control valve is positioned at the distal end of the transmittal control section.

43. The tire repair tool of claim 31, further comprising a driver housing; said driver housing said handle comprising:
a) an elongated body that fits over the gas cartridge;
b) a proximal end;
c) a distal end;
d) an inside rim at the proximal end of the elongated body that mates with an outside distal rim of the transmittal control section;
e) a threaded opening in the distal end of the elongated body;
f) an elongated thumb screw that fits through the threaded opening; and
g) a cap which fits over a rounded end of the proximal end of the gas cartridge.

44. The tire repair tool of claim 31, wherein said insertion tube is in the form of a plugger, said plugger comprising:
a tong assembly positioned at the proximal end of said plugger, said tong assembly used to position a repair cord into a puncture hole in a tire.

45. The tire repair tool of claim 31, further comprising:
a) threading within the proximal end of the insertion tube; and
b) a plugger, said plugger having a distal end and a proximal end, said distal end of said plugger having threading to thread with said proximal end of the insertion tube.

* * * * *